(12) United States Patent
DeNicola

(10) Patent No.: US 11,185,065 B2
(45) Date of Patent: Nov. 30, 2021

(54) ANIMAL TRAP

(71) Applicant: White Buffalo, Inc, Moodus, CT (US)

(72) Inventor: Anthony J. DeNicola, Moodus, CT (US)

(73) Assignee: White Buffalo, Inc, Moodus, CT (US)

( * ) Notice: Subject to any disclaimer, the term of this patent is extended or adjusted under 35 U.S.C. 154(b) by 0 days.

(21) Appl. No.: 17/084,944

(22) Filed: Oct. 30, 2020

(65) Prior Publication Data

US 2021/0144988 A1    May 20, 2021

Related U.S. Application Data

(60) Provisional application No. 62/935,272, filed on Nov. 14, 2019, provisional application No. 63/011,546, filed on Apr. 17, 2020.

(51) Int. Cl.
*A01M 23/08* (2006.01)
*A01M 23/02* (2006.01)
*A01M 23/14* (2006.01)

(52) U.S. Cl.
CPC ............ *A01M 23/08* (2013.01); *A01M 23/02* (2013.01); *A01M 23/14* (2013.01)

(58) Field of Classification Search
CPC ...... A01M 23/00; A01M 23/02; A01M 23/08; A01M 23/14; A01K 69/00; A01K 69/02;
(Continued)

(56) References Cited

U.S. PATENT DOCUMENTS

| 496,164 A | * | 4/1893 | Manning | ............... A01M 21/00 43/65 |
| 597,214 A | * | 1/1898 | Douglass | ............... A01K 31/08 119/474 |

(Continued)

FOREIGN PATENT DOCUMENTS

| FR | 2501003 A1 | * | 9/1982 | ............. A01K 73/12 |
| FR | 2955456 B1 | * | 7/2012 | ............ A01M 23/08 |

(Continued)

OTHER PUBLICATIONS

Translation of JP 2017-176082 (Year: 2017).*

(Continued)

*Primary Examiner* — Darren W Ark
(74) *Attorney, Agent, or Firm* — Getz Balich LLC

(57) ABSTRACT

An animal trap is provided that includes a plurality of posts and a net structure. The net structure is attached to the posts. The net structure has a width that extends between an upper lateral edge and a lower lateral edge, a first length that extends between a first lengthwise end and a second lengthwise end at the upper lateral edge, and a second length that extends between the first and second lengthwise ends at the lower lateral edge. The net structure includes a net and an upper cord. The upper cord is attached to the net. The net structure is configurable in a set configuration having an interior trap region. In the set configuration, the net structure has a first circumference at the upper lateral edge and a second circumference at the lower lateral edge. The first circumference is greater than the second circumference.

18 Claims, 12 Drawing Sheets

(58) Field of Classification Search
CPC ........ A01K 69/04; A01K 69/06; A01K 69/10;
A01K 74/00; A01K 79/00; A01K 99/00;
A01K 61/60; A01K 61/65; A01K 61/75;
A01K 61/78; A01K 1/0035; A01K
1/0254; A01K 31/07; A01K 31/08; A01K
15/02; A01K 15/027; A01K 15/04; E04H
4/06
USPC ........... 43/58, 64–67, 73, 100, 101, 105, 10;
119/223; 256/12.5, 13, 19; 405/302.4,
405/302.6, 302.7
See application file for complete search history.

(56) References Cited

U.S. PATENT DOCUMENTS

| | | | | |
|---|---|---|---|---|
| 619,566 | A * | 2/1899 | Hall | A01M 21/00 43/65 |
| 2,549,475 | A * | 4/1951 | Jardim | A01K 73/12 43/11 |
| 2,680,922 | A * | 6/1954 | Welfl | A01M 23/00 43/1 |
| 2,814,326 | A * | 11/1957 | Washabaugh | B21F 27/127 72/392 |
| 3,061,966 | A * | 11/1962 | Kreutzer | A01K 79/00 43/4.5 |
| 3,172,229 | A * | 3/1965 | Swanson | A01M 23/00 43/65 |
| 3,484,981 | A * | 12/1969 | Gilmer | A01K 77/00 43/105 |
| 3,593,688 | A * | 7/1971 | Whitener | A01K 31/08 119/453 |
| 3,678,971 | A * | 7/1972 | Nordgren | B21F 27/127 140/107 |
| 3,715,831 | A * | 2/1973 | Mason | A01K 74/00 43/4.5 |
| 3,815,279 | A * | 6/1974 | Poirot | A01K 69/00 43/105 |
| 3,905,143 | A * | 9/1975 | Poirot | A01K 74/00 43/7 |
| 4,092,797 | A * | 6/1978 | Azurin | A01K 73/12 43/102 |
| 4,174,582 | A * | 11/1979 | McKnight | A01K 73/12 43/106 |
| 4,411,092 | A * | 10/1983 | Lalancette | A01K 69/08 43/100 |
| 4,452,005 | A * | 6/1984 | Poirot | A01K 69/06 43/100 |
| 5,063,876 | A * | 11/1991 | Harris | A01K 15/027 119/513 |
| 5,131,218 | A * | 7/1992 | Berger | A01K 79/00 43/44.98 |
| 5,193,481 | A * | 3/1993 | Loverich | A01K 61/60 119/223 |
| 5,218,925 | A * | 6/1993 | Anderson | A01K 1/0088 119/501 |
| 5,231,820 | A * | 8/1993 | Berger | A01K 79/00 43/44.98 |
| RE34,971 | E * | 6/1995 | Loverich | A01K 73/12 119/223 |
| 5,509,227 | A * | 4/1996 | Marrero | A01K 71/00 43/100 |
| 5,553,833 | A * | 9/1996 | Bohen | E01F 13/026 256/19 |
| 5,617,813 | A * | 4/1997 | Loverich | A01K 61/60 119/223 |
| 5,758,602 | A * | 6/1998 | Fuglsang | A01K 61/54 119/223 |
| 5,961,099 | A * | 10/1999 | Thommen, Jr. | E01F 7/04 256/12.5 |
| 5,966,862 | A * | 10/1999 | Ueno | A01M 23/32 43/58 |
| 6,142,704 | A * | 11/2000 | Coyne | E02B 3/04 256/13 |
| 6,786,000 | B1 * | 9/2004 | Hong | A01K 69/10 43/105 |
| 6,843,616 | B2 * | 1/2005 | Sychra | E01F 7/02 210/170.03 |
| 7,140,599 | B1 * | 11/2006 | Spink | B63G 9/04 256/13 |
| 7,293,530 | B2 * | 11/2007 | Italiano | A01K 1/03 119/453 |
| 7,398,617 | B2 * | 7/2008 | Mattox | A01M 23/00 43/58 |
| 7,487,614 | B1 * | 2/2009 | Walker | A01K 69/02 43/10 |
| 7,523,719 | B2 * | 4/2009 | Miller | A01K 1/0254 119/496 |
| 7,744,313 | B2 * | 6/2010 | Terai | B63G 9/04 405/211 |
| 7,854,088 | B2 * | 12/2010 | Kurachi | A01M 23/08 43/61 |
| 8,042,491 | B2 * | 10/2011 | Fulbrook | A01K 61/70 119/219 |
| 8,061,076 | B2 * | 11/2011 | Kelley | A01M 23/20 43/61 |
| 8,261,697 | B2 * | 9/2012 | Hsu | A01K 61/60 119/223 |
| 8,336,250 | B2 * | 12/2012 | Kelley | A01M 23/20 43/61 |
| 8,661,727 | B2 * | 3/2014 | Alfarhan | A01M 23/20 43/63 |
| 9,101,126 | B2 * | 8/2015 | Pinkston | A01M 31/00 |
| 9,237,743 | B2 * | 1/2016 | Gaskamp | H04N 5/232 |
| 9,271,477 | B2 * | 3/2016 | Angell | A01K 61/10 |
| 9,545,094 | B2 * | 1/2017 | Dykes | A01M 23/20 |
| 9,572,328 | B1 * | 2/2017 | Head | A01K 69/06 |
| 9,668,467 | B2 * | 6/2017 | Gaskamp | G06K 9/00362 |
| 9,781,906 | B2 * | 10/2017 | Wang | A01K 61/70 |
| 9,814,228 | B2 * | 11/2017 | Pinkston | A01M 23/00 |
| 9,826,710 | B1 * | 11/2017 | McNew | A01K 1/0017 |
| 10,076,109 | B2 * | 9/2018 | Gaskamp | A01M 23/22 |
| 10,098,339 | B2 * | 10/2018 | Pinkston | G03B 29/00 |
| 10,375,940 | B2 * | 8/2019 | Al-Farhan | A01K 73/12 |
| 10,470,454 | B2 * | 11/2019 | Gaskamp | A01M 23/16 |
| 10,534,967 | B2 * | 1/2020 | Atwater | G06K 9/00771 |
| 10,645,901 | B2 * | 5/2020 | McNew | A01K 1/0088 |
| 10,905,090 | B2 * | 2/2021 | Morris | A01K 1/0017 |
| 10,959,416 | B2 * | 3/2021 | Bajer | A01K 69/04 |
| 2005/0183331 | A1 * | 8/2005 | Kania | A01K 61/60 47/65.5 |
| 2009/0293340 | A1 | 12/2009 | Kelley | |
| 2010/0064572 | A1 * | 3/2010 | Kurachi | A01M 23/08 43/61 |
| 2011/0073046 | A1 * | 3/2011 | Fischer | A01K 15/02 119/718 |
| 2011/0167709 | A1 | 7/2011 | Pinkston | |
| 2013/0205645 | A1 * | 8/2013 | Gaskamp | A01M 31/002 43/62 |
| 2016/0050903 | A1 | 2/2016 | Gaskamp | |
| 2018/0070556 | A1 * | 3/2018 | Hagen | A01K 3/005 |
| 2018/0077919 | A1 | 3/2018 | McNew | |
| 2019/0364874 | A1 * | 12/2019 | Hufstedler | A01M 23/00 |
| 2020/0068860 | A1 * | 3/2020 | Bajer | A01K 75/00 |
| 2020/0104602 | A1 * | 4/2020 | Atwater | A01K 61/60 |
| 2020/0187463 | A1 * | 6/2020 | Grytdal | A01K 61/10 |
| 2020/0187464 | A1 * | 6/2020 | MacGillivray | A01K 61/60 |
| 2020/0260683 | A1 * | 8/2020 | McNew | A01K 1/0035 |
| 2021/0007333 | A1 * | 1/2021 | Cui | A01K 61/60 |
| 2021/0144979 | A1 * | 5/2021 | Bajer | A01K 69/04 |

FOREIGN PATENT DOCUMENTS

| | | | | |
|---|---|---|---|---|
| GB | | 692318 A | * 6/1953 | ............ A01M 23/00 |
| GB | | 729110 A | * 5/1955 | ............ A01M 23/00 |
| JP | | S56141088 | 10/1981 | |
| JP | | 03297338 A | * 12/1991 | |
| JP | | H0641486 U | * 6/1994 | |
| JP | | 7011589 Y2 | * 3/1995 | |

(56) References Cited

FOREIGN PATENT DOCUMENTS

| | | | | | |
|---|---|---|---|---|---|
| JP | 2006000020 | A | * | 1/2006 | |
| JP | 2010207212 | A | * | 9/2010 | |
| JP | 2011125336 | A | * | 6/2011 | ............ A01K 61/60 |
| JP | 2011167083 | A | * | 9/2011 | |
| JP | 2011250718 | A | * | 12/2011 | |
| JP | 5315471 | B1 | * | 10/2013 | |
| JP | 2013243963 | A | * | 12/2013 | |
| JP | 2014014310 | A | * | 1/2014 | |
| JP | 2014083049 | A | * | 5/2014 | |
| JP | 6171144 | B2 | * | 8/2017 | |
| JP | 2017176082 | A | * | 10/2017 | |
| JP | 2018029626 | A | * | 3/2018 | |
| JP | 2018099044 | A | * | 6/2018 | |
| JP | 6421390 | B2 | * | 11/2018 | |
| JP | 6454847 | B2 | * | 1/2019 | |
| JP | 6534130 | B2 | * | 6/2019 | |
| JP | 2020166337 | A | * | 10/2020 | |
| JP | 2020171248 | A | * | 10/2020 | |
| KR | 20030045753 | A | * | 6/2003 | |
| KR | 20040094269 | A | * | 11/2004 | |
| KR | 20060088092 | A | * | 8/2006 | |
| KR | 20090076491 | A | * | 7/2009 | |
| KR | 20110101567 | A | * | 9/2011 | |
| WO | WO-9304576 | A1 | * | 3/1993 | ............ A01K 61/60 |
| WO | WO-2017083361 | A | * | 5/2017 | ............ A01K 74/00 |
| WO | WO-2019045582 | A1 | * | 3/2019 | ............ A01K 61/60 |
| WO | WO-2020122731 | A | * | 6/2020 | ............ A01K 69/10 |

OTHER PUBLICATIONS

Translation of JP 2011-125336 (Year: 2011).*
Translation JP 56-141088 U (Year: 1981).*
Translation of JP 59-6715 Y2 (Year: 1984).*
Australian Office Action for AU2020264312 dated Jul. 27, 2021.
EP search report for EP21153845.9 dated Jul. 20, 2021.

* cited by examiner

ANIMAL TRAP

CROSS-REFERENCE TO RELATED APPLICATIONS

This application claims priority to U.S. Provisional Patent Application No. 62/935,272 filed on Nov. 14, 2019, and U.S. Provisional Patent Application No. 63/011,546 filed on Apr. 17, 2020, both of which are hereby incorporated by reference in their entirety.

BACKGROUND OF THE INVENTION

1. Technical Field

The present disclosure relates to animal traps in general, and to net animal traps in particular.

2. Background Information

Feral swine are a destructive invasive species in many areas of the world. In the United States alone, it is estimated that two to six million feral hogs are currently present in at least thirty-nine states, and do millions of dollars in damage every year. Feral swine are prodigious breeders and in many areas have few or no natural predators.

Feral swine damage crops by consuming them or by their rooting, trampling, and wallowing behaviors. Field crops commonly targeted by feral swine include sugar cane, corn, grain sorghum, soy beans, wheat, oats, peanuts, and rice; however, they will eat almost any crop. Farmers may also experience damage to vegetable and fruit crops such as lettuce, spinach, melons, and pumpkins. Feral swine damage pasture grasses, killing desirable plant species. The decimation of these desirable plant species can, in turn, facilitate the proliferation of undesired weed species. Feral swine can also devastate orchards and vineyards by consuming fruit, berries, citrus, grapes, and nuts, destroy saplings and vines by roughly rubbing on the plants with their bodies (which they do to remove parasites from their skin), and damage large trees by scraping bark off with their tusks to mark territory, creating an entry point for diseases on the tree.

Feral swine compete with native wildlife for multiple resources, specifically food, habitat, and water. Feral swine diets overlap with those of native wildlife, such as bear, deer, and turkey, which results in competition for important and limited natural food supplies. Feral swine activity will often deter other species from living in an area, resulting in competition over prime habitat. Feral swine also prey directly on the nests, eggs, and young of native ground nesting birds and reptiles, including threatened or endangered species. Game birds such as wild turkeys, grouse, and quail are often negatively affected. Feral swine wallows are prime mosquito habitat which contributes to the prevalence of various mosquito-borne diseases. Wallows can also be a place of transmission for bacteria and parasites from feral swine to native wildlife that come to drink.

Feral swine are known to carry at least thirty (30) viral and bacterial diseases and nearly forty (40) parasites that can be transmitted to humans, pets, livestock, and other wildlife. Feral swine can pass pathogens in many ways; e.g., by direct contact with feral swine or their scat, via feed and water sources previously contaminated by feral swine, or by eating raw, infected feral swine meat, organs, or other tissues.

Efforts to control feral swine populations to date have been largely ineffective. The ability of feral swine to reproduce outpaces conventional hunting techniques, and very often landowners or local regulations do not permit hunting. Various traps are known, but none of these traps are capable of readily being used in all settings and therefore are limited. For example, feral swine are often present in remote areas, not easily accessible by vehicle. Box traps are typically large, heavy structures not easily carried, if at all, to a remote location. Indeed, the size and weight of box traps often not only limits where they can be utilized, but also how many swine may be caught therein. In some instances, box traps may be disassembled for transport, but then must be reassembled in the field—but the overall weight of the trap does not change. Box traps also typically have an elaborate door mechanism that permits ingress, but no exit, or remotely controlled doors that require a user to monitor the trap (e.g., via camera).

Some corral traps formed from stiff wire fencing may overcome the shortcomings of box traps, but they too have their own shortfalls. Although lighter than box traps, and typically larger than box traps, corral traps can also be prohibitively heavy and difficult to transport. The time required to set up stiff wire corral traps is typically significant, often requires some amount of environment clearance to enable the stiff wire fencing to be installed, and may be limited to use on flat ground areas. Like box traps, corral traps also typically utilize elaborate door mechanisms.

Other efforts to control feral swine populations utilize ingestible poisons. The use of poisons is often frowned upon for fear that native wildlife or domestic animals will either directly ingest the poison or will ingest the poison from a feral pig who earlier ingested the poison.

What is needed is a trap system and methodology that overcomes the shortfalls of currently available traps, and in particular a trap system and methodology that can be used for animals other than feral swine.

SUMMARY

According to an aspect of the present disclosure, an animal trap net structure is provided. The net structure includes a net and an upper cord. The net is formed from spaced apart orthogonal members that define openings between the members. The net has a width that extends between an upper lateral edge and a lower lateral edge, and a first length that extends between a first lengthwise end and a second lengthwise end at the upper lateral edge, and a second length that extends between the first lengthwise end and the second lengthwise end at the lower lateral edge. The second length is less than the first length. The upper cord is attached to the net at the upper lateral edge extending the first length of the net.

In any of the aspects or embodiments described above and herein, the net structure may include a bottom cord attached to the net at the lower lateral edge and extending the second length of the net.

In any of the aspects or embodiments described above and herein, the bottom cord may be a weighted cord having a lead core.

In any of the aspects or embodiments described above and herein, the net structure may include a mid-cord attached to the net, the mid-cord extending lengthwise between the first lengthwise end and a second lengthwise end, and disposed widthwise between the upper cord and the bottom cord.

In any of the aspects or embodiments described above and herein, wherein the net structure includes a plurality of rib cords, each extending lengthwise between the upper lateral edge and the lower lateral edge, the rib cords spaced apart from one another along the length of the net.

According to another aspect of the present disclosure, a trap for trapping animals on the ground is provided. The trap includes a plurality of posts and a net structure. The plurality of posts are configured to be secured in a ground surface. Each post has a length that includes a first lengthwise portion configured for disposal within the ground surface and a second lengthwise portion configured for disposal above the ground surface. The net structure is attached to the plurality of posts. The net structure has a width that extends between an upper lateral edge and a lower lateral edge, a first length that extends between a first lengthwise end and a second lengthwise end at the upper lateral edge, and a second length that extends between the first lengthwise end and the second lengthwise end at the lower lateral edge. The second length is less than the first length. The net structure includes a net and an upper cord. The net is formed from spaced apart orthogonal members defining openings between the members. The net extends from the upper lateral edge to the lower lateral edge, and extends from the first lengthwise end to the second lengthwise end. The upper cord is attached to the net at the upper lateral edge and extends the first length of the net. The net structure is configurable in a set configuration, and in the set configuration the net structure is closed defining an interior region of the trap. In the set configuration, the net structure has a first circumference at the upper lateral edge and a second circumference at the lower lateral edge. The first circumference is greater than the second circumference.

In any of the aspects or embodiments described above and herein, in the set configuration the net structure has a wall portion and ground portion, and the ground portion is configured to reside on the ground surface.

In any of the aspects or embodiments described above and herein, the ground portion has a width and the ground portion width is about 25%-40% of the width of the net structure.

In any of the aspects or embodiments described above and herein, the trap may include one or more anchoring devices for securing the lower lateral edge of the net structure to the ground surface. A non-limiting example of an anchoring device is an anchor stake configured to couple the lower lateral edge of the net structure with the ground surface.

In any of the aspects or embodiments described above and herein, the net structure may include a weighted bottom cord attached to the net at the lower lateral edge extending the second length of the net structure, and the weighted bottom cord may include a lead core.

In any of the aspects or embodiments described above and herein, the net structure may include a mid-cord attached to the net. The mid-cord extending lengthwise between the first lengthwise end and a second lengthwise end, and disposed widthwise between the upper cord and the bottom cord.

In any of the aspects or embodiments described above and herein, the net structure may include a plurality of rib cords, each rib cord extending lengthwise between the upper lateral edge and the lower lateral edge. The rib cords may be spaced apart from one another along the length of the net.

In any of the aspects or embodiments described above and herein, the trap may include a plurality of tensioning structures. Each tensioning structure may be configured to apply an outwardly radial force to a respective post.

In any of the aspects or embodiments described above and herein, the trap may include an upper edge panel attached to the net structure proximate the upper lateral edge, the upper edge panel extending radially inwardly a distance.

According to another aspect of the present disclosure, a method of trapping an animal is provided. The method includes: a) inserting a plurality of posts into a ground surface, the posts circumferentially spaced apart from one another; b) attaching a net structure to the plurality of posts, the net structure having a width that extends between an upper lateral edge and a lower lateral edge, and a first length that extends between a first lengthwise end and a second lengthwise end at the upper lateral edge, and a second length that extends between the first lengthwise end and the second lengthwise end at the lower lateral edge, wherein second length is less than the first length, the net structure including a net and an upper cord, the net having spaced apart members that define openings between the members, the net extending from the upper lateral edge to the lower lateral edge, and extending from the first lengthwise end to the second lengthwise end, and the upper cord attached to the net at the upper lateral edge extending the first length of the net; c) disposing the net structure in a set configuration, and in the set configuration: (i) the net structure is circumferentially closed defining an interior region of the trap; (ii) the net structure has a first circumference at the upper lateral edge and a second circumference at the lower lateral edge, and the first circumference is greater than the second circumference; and (iii) the net structure has a wall portion disposed above the ground surface and therefore not in contact with the ground surface, and a ground portion disposed in contact with the ground surface.

In any of the aspects or embodiments described above and herein, the ground portion has a width and the ground portion width may be about 25%-40% of the width of the net structure.

In any of the aspects or embodiments described above and herein, the method further including anchoring the lower lateral edge of the net structure to the ground surface, for example by inserting anchor stakes into the ground surface adjacent the lower lateral edge. The anchor stakes are configured to couple the lower lateral edge of the net structure with the ground surface, and configured to allow the lower lateral edge to travel vertically up the respective anchor stakes a distance great enough to allow an animal to pass under the net structure and into the interior region of the trap and to fall back to the ground surface after the animal has passed under the net structure and into the interior region of the trap.

In any of the aspects or embodiments described above and herein, the method further including disposing the net structure in a pre-set configuration prior to disposing the net structure in the set configuration, and in the pre-set configuration at least a portion of the net structure ground portion is held off of the ground surface thereby providing at least one passage into and out of the interior region of the trap.

In any of the aspects or embodiments described above and herein, wherein the net structure further comprises a mid-cord attached to the net, extending lengthwise between the first lengthwise end and a second lengthwise end, and disposed widthwise between the upper lateral edge and a lower lateral edge. In the set configuration, the upper cord and the mid-cord are attached to the plurality of posts, and the net is curved radially inwardly from the mid-cord to the ground portion.

In any of the aspects or embodiments described above and herein, the method further including: a) providing a plurality of tensioning structures; b) attaching the tensioning structures to the plurality of posts; and c) applying an outwardly radial force to a respective post using a respective one of the tensioning structures sufficient to produce tension in the upper cord.

The foregoing features and the operation of the present disclosure will become more apparent in light of the following description and the accompanying drawings.

DETAILED DESCRIPTION

Figure 1:
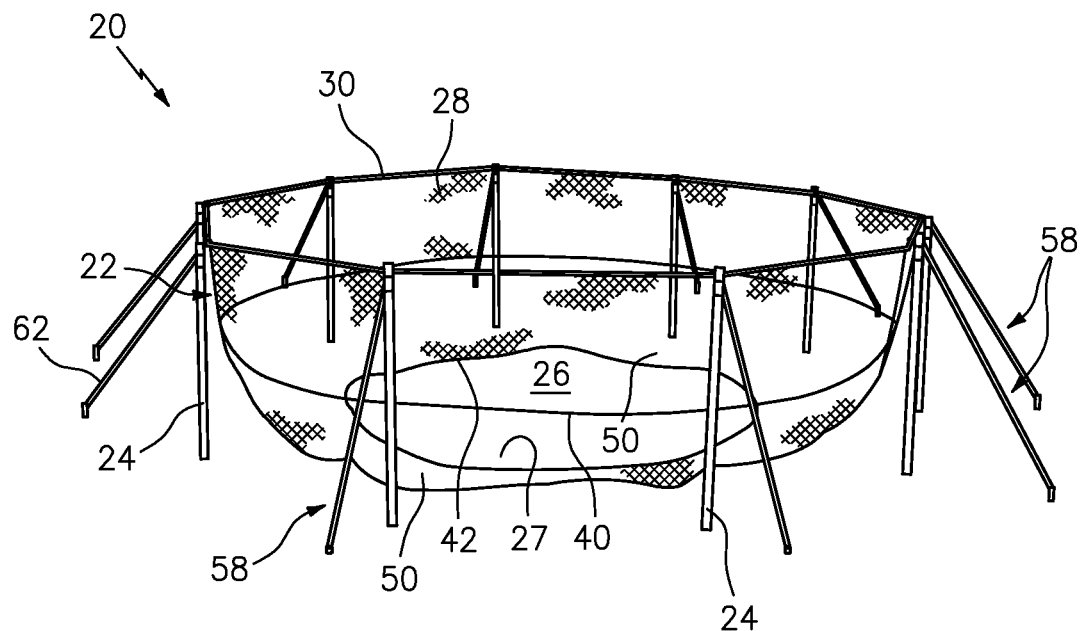
FIG. 1 is a diagrammatic perspective view of a present disclosure animal trap embodiment.
Figure 2:
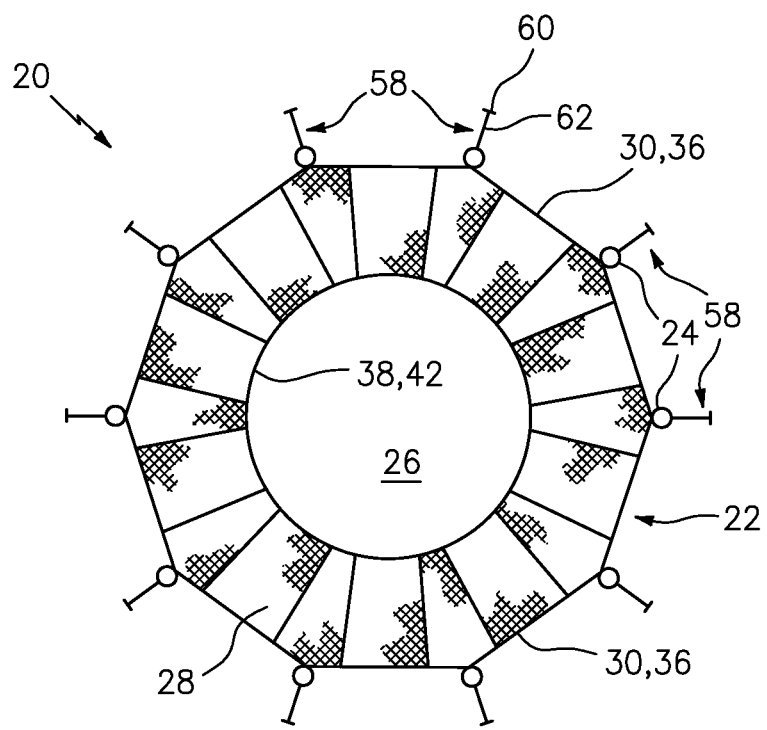
FIG. 2 is a diagrammatic top view of a present disclosure animal trap embodiment.

FIGS. 1 and 2 illustrate an exemplary embodiment of an animal trap 20 according to the present disclosure. The animal trap 20 embodiment includes a net structure 22. Some embodiments of the animal trap include a plurality of posts 24 as part of the trap 20. When the animal trap 20 is set up to trap animals (i.e., in a "set configuration"), the net structure 22 is configured as a closed circumferential structure that defines a trap interior region 26 and a trap opening 27; i.e., the net structure 22 is continuous around the circumference of the trap 20. More specifically, in the set configuration, a portion of the net structure 22 is in contact with the ground (described as a "ground portion 50" hereinafter), and the remainder of the net structure 22 extends upwardly from the ground, forming a closed wall structure. The term "closed structure" is used herein to mean that the net structure 22 extends continuously around the entire perimeter of the trap 20, with no door, gate, or opening within the closed wall structure that permits animal ingress or egress through the closed wall structure. As will be described herein, the lower lateral edge 38 of the ground portion 50 of the net structure 22 defines the trap opening 27. Also as will be described herein, embodiments of the present animal trap 20 may be configured with a substantially circular structure, with the net structure 22 in the set configuration having a first circumference at an upper lateral edge and a second circumference at a lower lateral edge 38 disposed on the ground. The second circumference is smaller than the first circumference. In some embodiments, the vertical top of the animal trap 20 is open.

The net structure 22 includes a net 28 and an upper cord 30. The net structure 22 has a length extending between a first lengthwise end 32 and a second lengthwise end 34, and a width extending between an upper lateral edge 36 and a lower lateral edge 38. In some embodiments, the length may be between thirty (30) and one hundred and twenty (120) feet long (e.g., between sixty (60) and eighty (80) feet) and the width may be in the range of six (6) to ten (10) feet wide. The upper cord 30 is disposed along the upper lateral edge 36 and extends lengthwise between the first and second lengthwise ends 32, 34. The size and material of the upper cord 30 can vary depending on the application. For many applications, the upper cord 30 may comprise a polymeric material such as polypropylene, nylon, polyester, polyethylene, aramid, or the like, and any combination thereof. Alternatively, the upper cord 30 may comprise natural fibers such as hemp. Generally speaking, an upper cord 30 comprising polymeric material is preferred because of its superior strength, resistance to degradation, and light weight. A specific non-limiting example of an upper cord 30 is a high-density polypropylene cord having a diameter in the range of about 0.25 inches to about 1.0 inches (0.25-1.0 inches; 6.35 mm-25.4 mm). The present disclosure is not, however, limited to any particular upper cord material or construction.

Figure 3:
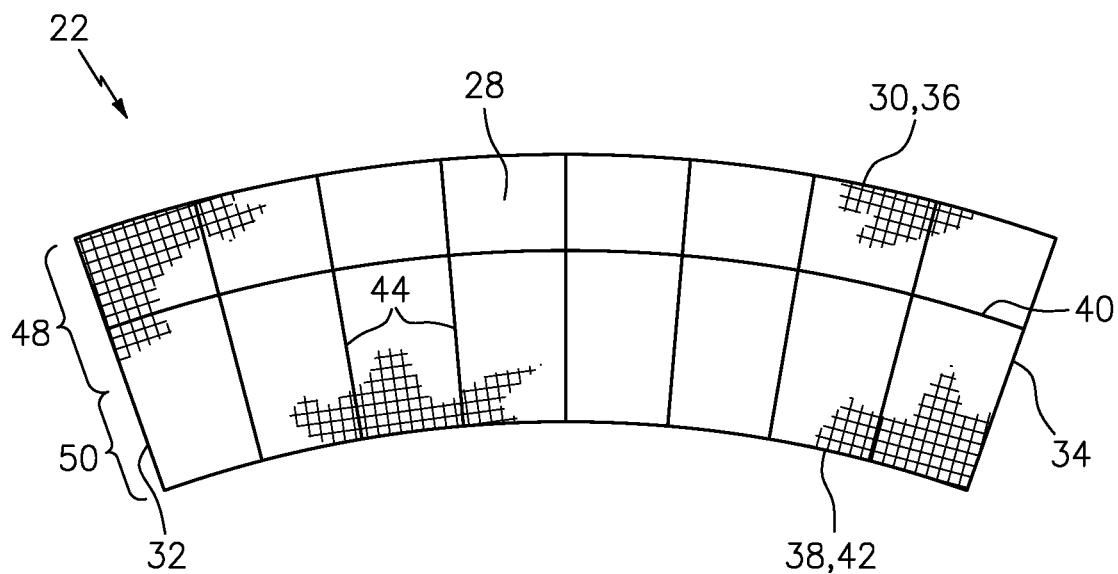
FIG. 3 is a diagrammatic view of a present disclosure net structure embodiment.
Figure 3A:
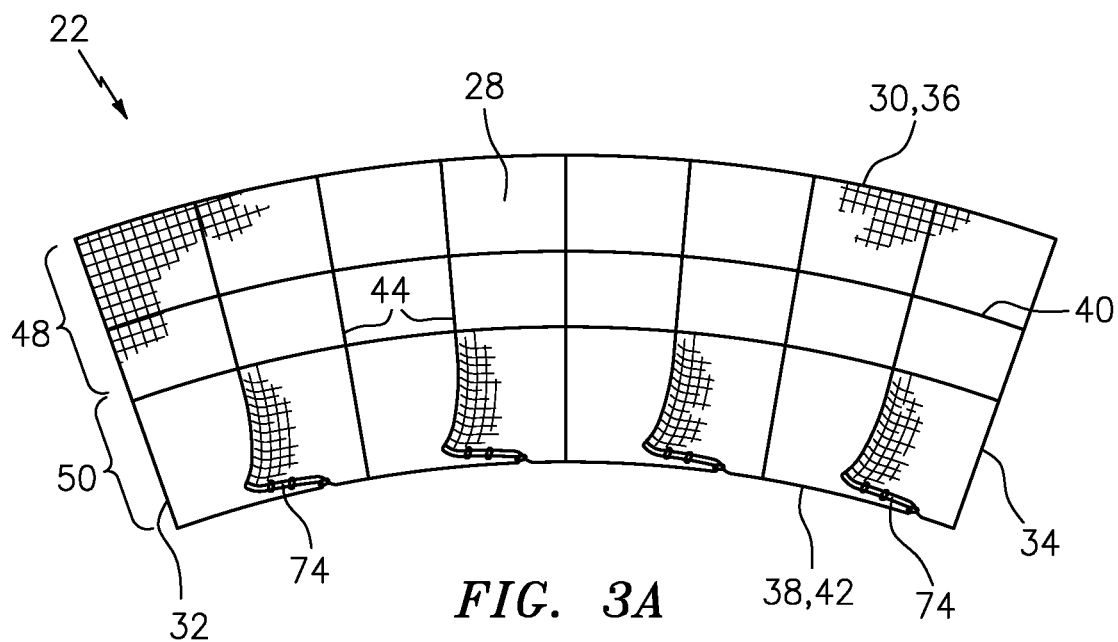
FIG. 3A is a diagrammatic view of a present disclosure net structure embodiment.

Referring to FIGS. 1, 3 and 3A, in some embodiments the net structure 22 may include a mid-cord 40 disposed in a middle region of the net 28 (i.e., between the upper lateral edge 36 and the lower lateral edge 38, and therefore spaced apart from the upper cord 30), extending lengthwise between the first and second lengthwise ends 32, 34. The term "mid-cord" should not be interpreted as implying that the mid-cord 40 is located at the geometric middle point of the width of the net 28. Typically in those embodiments that include a mid-cord 40, the upper cord 30 and the mid-cord 40 extend lengthwise generally parallel to one another. The size and material of the mid-cord 40 may be as described above for the upper cord 30. The mid-cord is not required to be the exact same size and material as the upper cord 30, however.

In some embodiments, the net structure 22 may include a bottom cord 42 attached to the net 28 along the lower lateral edge 38. The size and material of the bottom cord 42 may be as described above for the upper cord 30. In preferred embodiments, the bottom cord 42 may have a weight per unit length that is greater than the weight per unit length of the upper cord 30. A non-limiting example of an acceptable bottom cord 42 is a weighted cord having a lead core.

In some embodiments, the net structure 22 may include a plurality of widthwise extending rib cords 44 (e.g., extending widthwise between the upper lateral edge 36 and the lower lateral edge 38) spaced apart from one another at lengthwise positions. A rib cord 44 may be disposed at each lengthwise end 32, 34 of the net structure 22. The size and material of a rib cord 44 may be as described above for the upper cord 30. The rib cords 44 are not required to be the exact same size and material as the upper cord 30, however.

Figure 4:
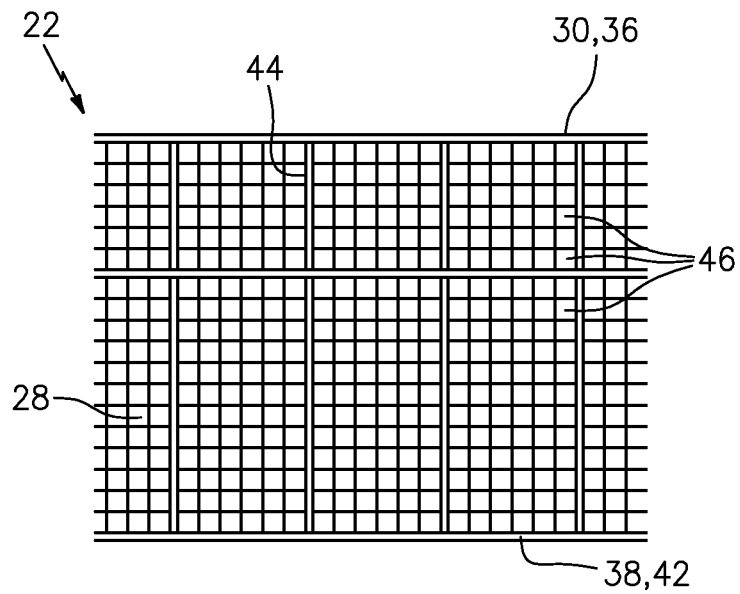
FIG. 4 is a diagrammatic partial view of a present disclosure net structure embodiment.

Referring to FIGS. 3, 3A, and 4, the net 28 is a mesh structure formed from a plurality of flexible lines that are connected to one another in a pattern that creates openings 46 between adjacent lines. The lines are attached to one another to one another to fix the size of the openings 46. The lines within the net 28 may be orthogonally arranged (e.g., vertically extending lines and horizontally extending lines), but the present disclosure is not limited to nets having orthogonal lines. The openings 46 within the net 28 are large enough so that the net 28 does not substantially obstruct vision through the net 28, but small enough to prevent the trapped animal from escaping through the openings 46. The net 28 is configured to withstand impacts by the animal being trapped (as will be described below), and is preferably also sufficiently durable to prevent a trapped animal from chewing or otherwise cutting through the net 28 during a period of time in which the animal is expected to be trapped. The net 28 may comprise polymeric materials such as polypropylene, nylon, polyester, polyethylene, aramid, and the like, or combinations thereof. Alternatively, the net 28 may comprise natural fibers such as hemp. Generally speaking, polymeric nets are preferred because of their superior strength, resistance to degradation, and light-weight. The present disclosure is not, however, limited to any particular net 28 material or construction. Non-limiting examples of acceptable nets 28 include some nets of the type constructed for use as baseball nets, or golf ball nets, or in some instances fishing nets. For a net structure 22 configured for trapping feral swine, a net 28 comprising a twine flexible line size in the range of #18-#96 twine (i.e., a twine diameter range of about 1.5 mm to about 4.0 mm, or about 0.06 inches to about 0.158 inches), and having openings 46 in the range of about 0.75 inches (19.0 mm) to about 2.0 inches (50.8 mm) is typically acceptable. The present disclosure is not limited to these exemplary flexible line diameter and opening range values. The specific characteristics of the net 28 may depend on the application at hand, and the net 28 materials being used; e.g., a net flexible line having a greater tensile strength may permit a smaller diameter flexible line, etc.

Figure 5:
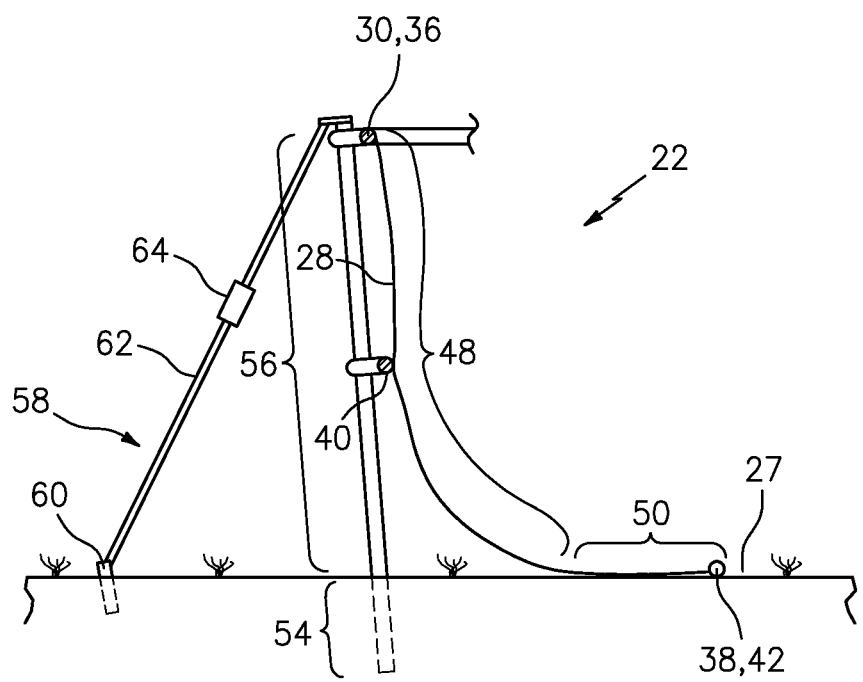
FIG. 5 is a diagrammatic side view of a portion of a present disclosure animal trap embodiment.
Figure 6:
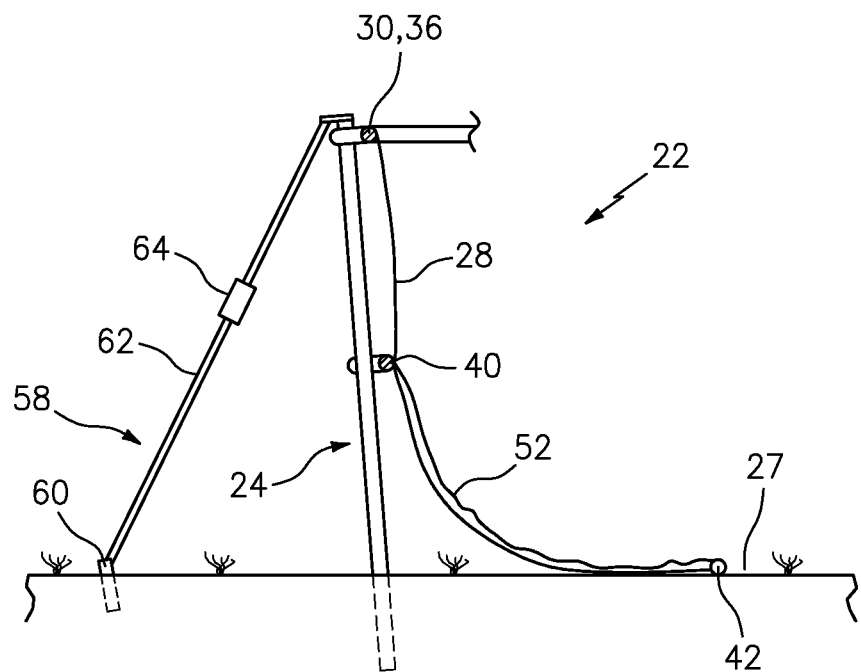
FIG. 6 is a diagrammatic side view of a portion of a present disclosure animal trap embodiment.
Figure 14:
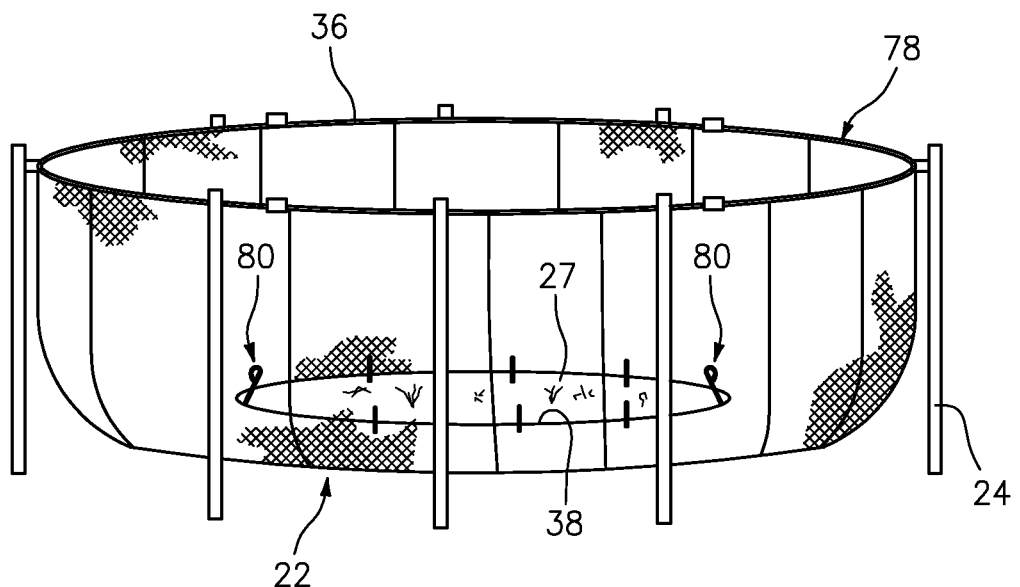
FIG. 14 diagrammatically illustrates an embodiment of the present disclosure trap having a structural ring.

Referring to FIGS. 5 and 6, the net structure 22 may be described as having a wall portion 48 and a ground portion 50. In the set configuration, the wall portion 48 is disposed above the ground and therefore not in contact with the ground. The ground portion 50, in contrast, is disposed in contact with the ground when the net structure 22 is in the set configuration. In the set configuration, the circumferentially extending lower lateral edge 38 defines the trap opening 27; i.e., defines a central ground area encircled by the net structure 22 where no net 28 resides on the ground. The width of the ground portion 50 of the net structure 22 is great enough such that when an animal in the interior region of the trap approaches the wall portion 48, that animal will step on the ground portion 50. The weight of the animal stepping on the ground portion 50 as it approaches the wall portion 48 helps to anchor the net structure 22 to the ground and prevent the animal from escaping from the trap 20. In terms of the entire width of the net structure 22, the ground portion 50 is typically about 25-40% of the width of the net structure 22. Embodiments of the present disclosure trap 20 that are configured to trap feral swine, for example, typically have a net structure ground portion 50 that is about twenty-four to about thirty-six inches (24-36"; 610-915 mm) wide when the trap 20 is in a set configuration, and an overall net structure 22 width of about ninety to ninety-six inches (90-96 inches; 2280 mm-2440 mm). As can be seen in the Figures, along any diagonal line bisecting the trap 20, the ground portion 50 (in the set configuration) will extend a distance radially inward on a first side of the trap 20, ending at the lower lateral edge 38. From there, along the same diagonal line, the trap opening 27 (no net 28) extends to the ground portion 50 extending radially inward from a second side of the trap 20, opposite the first side. The present disclosure is not limited to any particular wall portion 48 height, and therefore not limited to any overall net structure 22 width. As described herein, embodiments of the present disclosure may include a net 28 that has a first length that extends between lengthwise ends 32, 34 of the net 38 at the upper lateral edge 36, and a second length that extends between the lengthwise ends 32, 34 of the net at the lower lateral edge 38, wherein the second length is less than the first length. This difference in lengths between the upper and lower lateral edges 36, 38 is also disclosed herein in terms of circumference; i.e., a first circumference at the upper lateral edge 36 and a second circumference at the lower lateral edge 38, wherein the first circumference is greater than the second circumference. The length of the net 28 is disclosed herein as being within the range of thirty to one hundred and twenty feet long (30-120 ft), and in particular between sixty and eighty feet long (60-80 ft). As disclosed herein, the width of the net 28 may be in the range of six to ten feet wide (6-10 ft). As disclosed herein, the width of the net 28 may be described as having a wall portion 48 and a ground portion 50, and the ground portion 50 is typically about 25-40% of the width of the net 28. Within these parameters, the size of the trap opening 27 when the trap 20 is in a set/closed configuration will vary depending on the length of the net 28, the width of the net 28, and the percentage of the net 28 width that is occupied by the ground portion 50 and may be described in terms of a range. The aforesaid net 28 size range may extend between a net 28 at the upper end of the range with an upper lateral edge 36 length of 120 ft (which defines an upper lateral edge diameter of about 38 ft, a lower lateral edge 38 length of about 107 ft, and a lower lateral edge diameter (i e trap opening) of about 34 ft) to a net 28 at the lower end of the range with an upper lateral edge 36 length of about 30 ft (which defines a lower lateral edge 38 length of about 17 ft, and a lower lateral edge 38 diameter (i.e., trap opening 27 diameter) of about 3 ft). In the specifically disclosed net 28 embodiment having an upper lateral edge 36 length of 60 ft, the net 28 would have an upper lateral edge 36 diameter of about 19 ft, a lower lateral edge 38 length of about 47 ft, and a lower lateral edge 38 diameter (i.e., trap opening 27) of about 15 ft. In all net 28 embodiments, the trap opening 27 is sized to permit an animal (e.g., feral swine) to enter the trap 20 through the trap opening 27. The relative size of the trap upper lateral edge 36 diameter to the trap lower lateral edge 38 diameter (i.e., trap opening 27 diameter) is illustrated in FIGS. 1, 2, and 14. Within the given exemplary net parameters, the trap opening 27 diameter is typically in the range of about 35% to about 90% of the trap diameter at the upper lateral edge 36.

Figure 20:
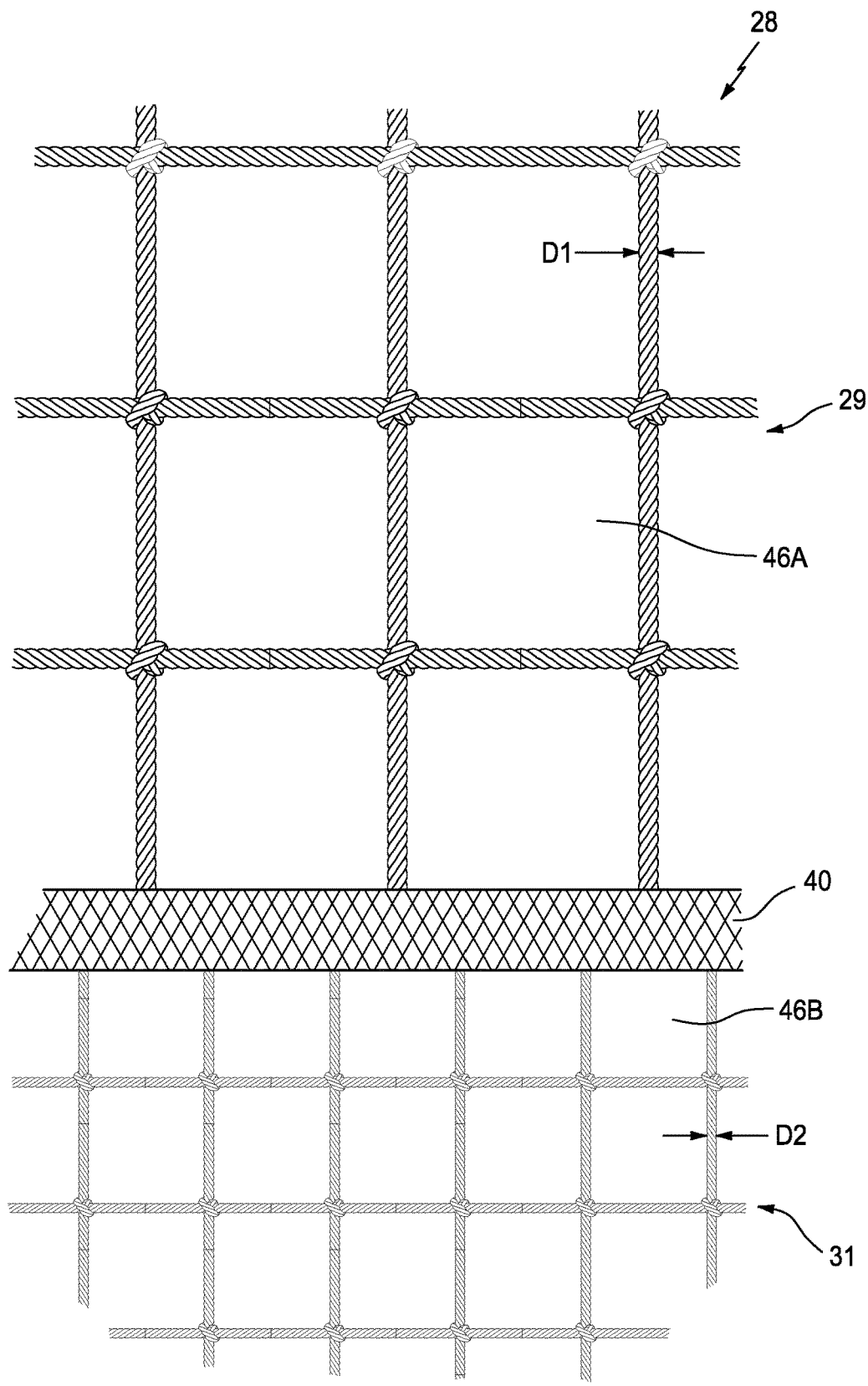
FIG. 20 illustrates a net configuration having a first net region having a first net configuration, and a second net region having a second net configuration, where the second net configuration is different from the first net configuration.

In some embodiments, the entirety of the net 28 has a uniform configuration; e.g., the same flexible line diameter, material, and opening size throughout the entire net 28 (as shown in FIG. 4). In alternative embodiments, the net 28 may include two or more regions each having a different net configuration; e.g., a first net region 29 having a first net configuration, and a second net region 31 having a second net configuration, where the second net configuration is different from the first net configuration (as shown in FIG. 20). For example, a net structure 22 that includes a mid-cord 40 may include a first net region 29 having a first net configuration disposed between the mid-cord 40 and the upper lateral edge 36/upper cord 30, and a second net region 31 having a second net configuration disposed between the mid-cord 40 and the lower lateral edge 38/bottom cord 42. To prevent escape by even the smallest animals (e.g., piglets) and/or to facilitate ingress into the trap 20, the second net configuration (including the ground portion 50 of the net structure) may comprise smaller openings 46B and smaller diameter (D2) flexible line than a first net configuration (openings 46A, flexible line diameter D1) that predominates the wall portion 48 of the net structure (i.e., openings 46B<openings 46A and D2<D1). The smaller net openings 46B can be selected to minimize the possibility of the animal becoming entangled in the net 28 (e.g., in terms of a feral pig, getting a hoof or a snout stuck in an opening 46B).

In some embodiments the net structure 22 may include a secondary wall portion 52 (i.e., an additional wall portion) that is attached to the net structure 22 between the upper and lower lateral edges 36, 38 (e.g., at the mid-cord 40 if one is included), and extends downwardly toward the lower lateral edge 38; e.g., the secondary wall portion 52 may rest on the net 28, including the ground portion 50, extending widthwise to the lower lateral edge 38, and lengthwise between the first and second lengthwise ends 32, 34—see FIG. 6. In those embodiments wherein the net structure 22 includes a secondary wall portion 52, the net opening 46 size of the secondary wall portion 52 may be smaller than the net opening 46 size of the adjacent net. In such an embodiment, the heavier twine size of the net 28 provides desirable strength to withstand impact forces, and the lighter twine size and smaller openings 46 of the secondary lower wall region 52 helps avoid the animal entanglement (e.g., hoof or snout entanglement, etc.). Furthermore, a secondary lower wall region 52 with a lighter twine size and smaller openings 46 also typically possesses greater drapability and facilitates maintaining the ground portion 50 in contact with the ground to prevent captured feral swine from escaping.

The upper cord 30 (and one or more of the mid-cord 40, bottom cord 42, and rib cords 44 where included) may be connected to the net 28 in a variety of different ways. For example, the upper cord 30 (and other cords 40, 42, 44 as included) may be attached to the net 28 by sewn attachment; e.g., the net 28 may be configured with integral twines that attach the net 28 to the upper cord 30 (e.g., see FIG. 7). A sewn connection between the cords 30, 40, 42, 44 and the net 28 is advantageous for several reasons; e.g., it does not require any independent fasteners, and can often be implemented during construction of the net structure 22. The present disclosure is not, however, limited to a net structure 22 having cords 30, 40, 42, 44 attached to the net 28 by sewn attachment. For example, any of the cords 30, 40, 42, 44 may be independent of the net 28 and may be attached to the net 28 by mechanical fasteners. Still further, any of the cords 30, 40, 42, 44 may be independent of the net 28 and weaved through the net 28 to create the connection there between.

Referring to FIGS. 5 and 6, in those trap 20 embodiments that include posts 24, the posts 24 are configured to support the net structure 22 above the ground, and to be anchored within the ground. Each post 24 may therefore be described as having a length that includes a first lengthwise portion 54 (for disposal within the ground when installed) and a second lengthwise portion 56 (for disposal above the ground when installed). The overall length of each post 24 is chosen so that the first lengthwise portion 54 is long enough to securely mount the post 24 in the ground, and the second lengthwise portion 56 is long enough to hold the net structure 22 at a height where the animal to be trapped is unable to escape over the net structure 22. A non-limiting example of an acceptable post 24 is a metal post possessing sufficient mechanical strength to support the net structure 22 during use. A specific example of an acceptable metal post is a commonly available T-post that may be driven into the ground. The present disclosure is not limited to metal posts, including metal T-posts. In some instances, an alternative post (e.g., an existing tree or the like) may be used as one or more of the posts 24.

The potential for a post 24 to be dislodged from the ground (e.g. after multiple animal impacts, etc.) is a typically a function of factors that include the ground condition and the lengthwise portion of the post 24 (e.g., first lengthwise portion 54) disposed in the ground. A post 24 driven into compact, hard ground is less likely to be dislodged than a post 24 driven into soft ground. As is described herein, when the present disclosure trap 20 is in a set configuration it is preferable (but not required) to place the upper cord 30 of the net structure 22 in tension. If the ground conditions are hard, and the posts 24 possess sufficient mechanical strength to avoid substantial elastic deflection, it may be possible to place the upper cord 30 in tension using the posts 24 and net structure 22 alone.

Figure 7:
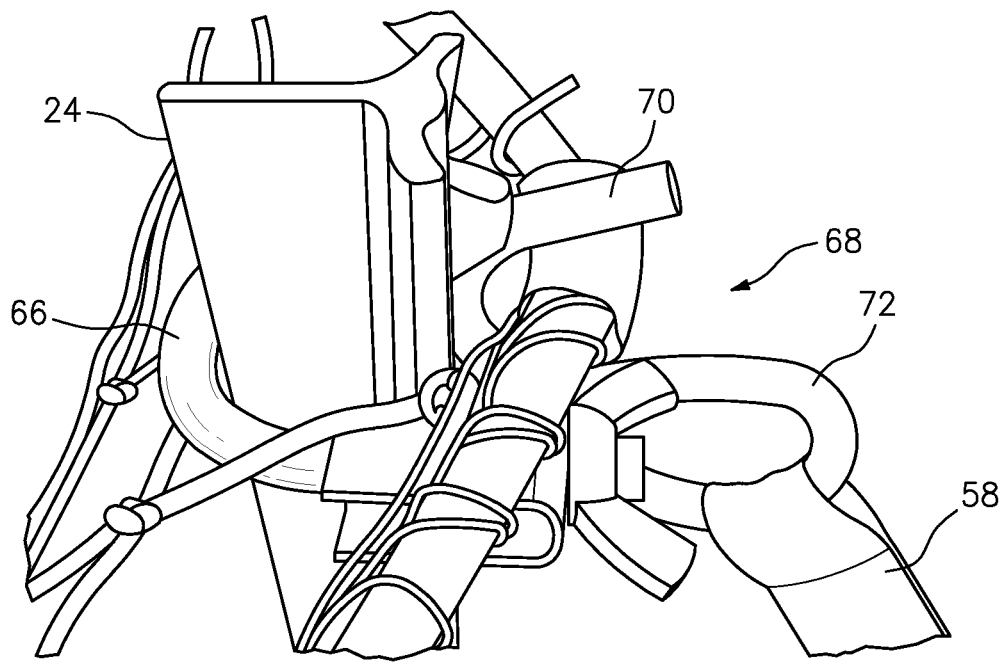
FIG. 7 is a diagrammatic view of a tensioning structure hardware embodiment, illustrating an upper cord engaged with the hardware.
Figure 8:
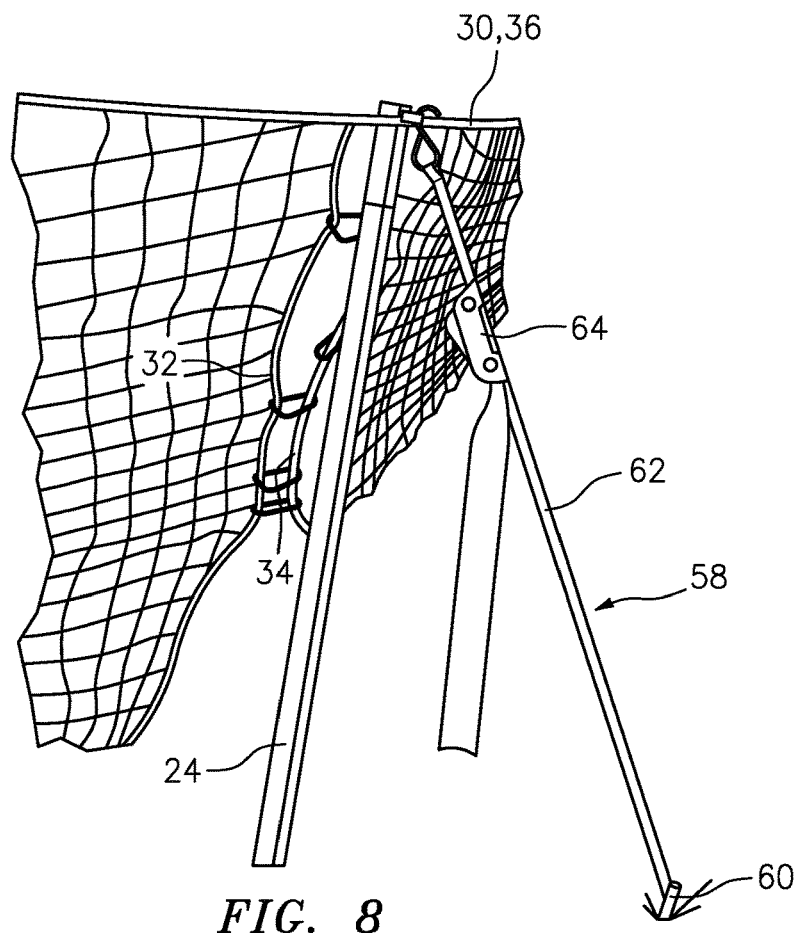
FIG. 8 is a diagrammatic partial view of a present disclosure net structure embodiment, illustrating lengthwise ends coupled together.
Figure 9:
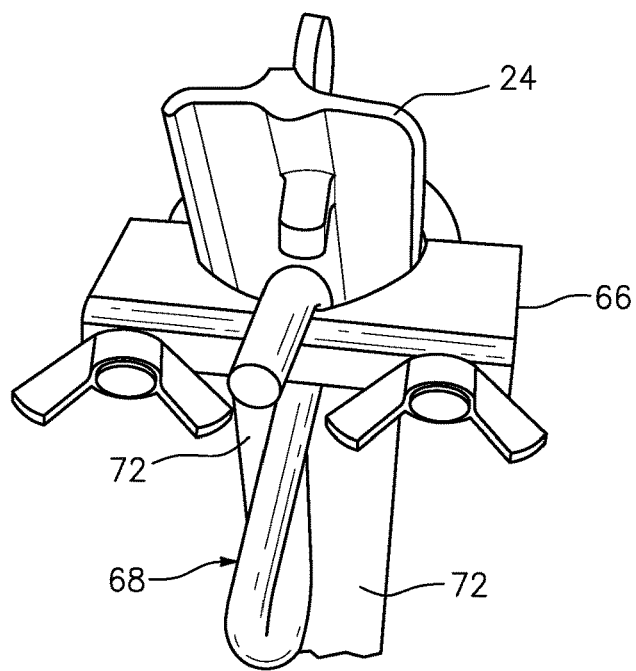
FIG. 9 is a diagrammatic view of a tensioning structure hardware embodiment.
Figure 10:
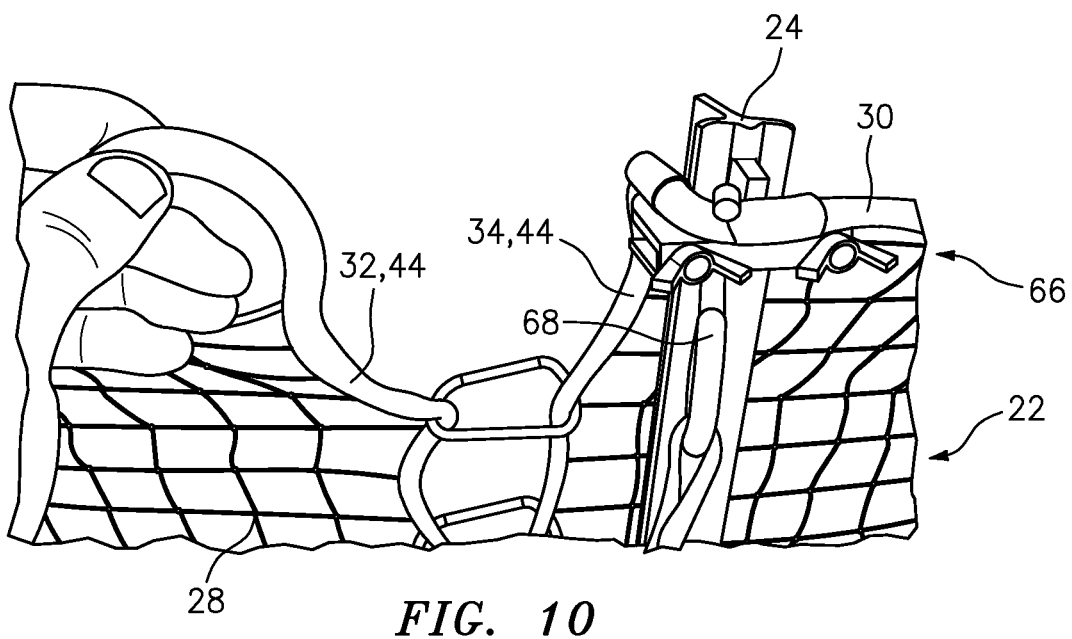
FIG. 10 diagrammatically illustrates an upper corner of the net structure looped around a post, engaged with tensioning structure hardware.

Referring to FIGS. 5, 6, and 8, in some embodiments of the present disclosure, however, the trap 20 may include tensioning structures 58 for attachment to one or more of the posts 24 to facilitate placing and maintaining the upper cord 30 in tension. In fact, the tensioning structures 58 can be used to produce the desired tension in the upper cord 30 by pulling the cord radially outward. To be clear, however, not every embodiment of the present disclosure trap 20 requires tensioning structures 58. In those embodiments that do utilize tensioning structures 58, each respective post 24 preferably has a separate tensioning structure 58. A tensioning structure 58 may include a cleat 60 that is securable to the ground and a tensioning strap 62 that can be deployed between the post 24 and the ground cleat 60. The tensioning straps 62 preferably include a mechanism 64 that can be used to decrease the length of the tensioning strap 62 (e.g., the length between the ground cleat 60 and the post 24) and thereby apply a radially outward force to the post 24. A variety of different type tensioning strap 62 materials may be used; e.g., fabric straps, rope straps, cable straps, etc. For those embodiments that include a mechanism 64 for adjusting the length of the strap 62, a variety of different mechanisms 64 can be used; e.g., ratchets, cam devices, turnbuckles, etc. The present disclosure is not limited to any particular type of tensioning strap 62 or mechanism 64 for changing the length of a strap (when included). An example of hardware that may be used to connect a tensioning strap 62 to a post 24 is shown in FIGS. 7, 9, and 10. The hardware includes a clamp 66 and a J-hook 68. The J-hook 68 shown in FIGS. 7, 9, and 10, includes an open hook portion 70 and a closed eye 72. The clamp 66 may be used to secure the open hook portion 70 to the post 24 and the tensioning strap 62 can be connected to the closed eye 72. This hardware configuration is a non-limiting example of inexpensive hardware that can be used to secure the tensioning strap 62 to the post 24. This hardware also provides a desirable means for securing the upper cord 30 to the post 24. As described below and shown in FIGS. 7 and 10, the upper cord 30 may be disposed around the exterior of the post 24 and within the open hook portion 70 to inhibit the upper cord 30 from being dislodged from the post 24.

Embodiments of the present animal trap 20 are typically configured to be assembled as a substantially circular structure. At the top of the animal trap 20 (e.g., at the upper cord 30), the "circular structure" may in fact be closer to polygonal shape dictated by the number of posts 24; e.g., an animal trap 20 that has eight posts 24 may have a substantially octagonal shape at the upper cord 30, or one having ten posts 24 may have a substantially decagonal shape (as shown in FIG. 2), etc. For ease of description herein, the shape will be referred to as a substantially circular structure having a diameter and circumference. The maximum diameter/circumference of the animal trap 20 is at the upper cord 30/upper lateral edge 36. In the set configuration, the net structure 22 initially extends substantially downwardly away from the upper cord 30, and then arcuately transitions radially inward, with the ground portion 50 disposed on the ground, terminating at the lower lateral edge 38. As indicated herein, the lower lateral edge 38 defines the trap opening 27. As a result, diameter/circumference of the net structure 22 at the lower lateral edge 38 (i.e., at the trap opening 27) is substantially smaller than the diameter/circumference at the upper lateral edge 36/upper cord 30. To accommodate the differences in diameter/circumference, at least a portion of the net structure 22 (e.g., the ground portion 50) may have a tapered configuration that produces the smaller diameter at the lower lateral edge 38; e.g., see FIG. 3. Alternatively, the net structure 22 may have the same circumferential length at the upper cord 30 and at the lower lateral edge and portions 74 of the ground portion 50 may be "cinched up" (e.g., folded over onto itself and coupled with fasteners—see FIG. 3A) to create a smaller diameter/circumference at the lower lateral edge 38 (i.e., a smaller diameter/circumference trap opening 27). The difference in diameter/circumferential length between the upper lateral edge 36/upper cord 30 and the lower lateral edge 38 helps to maintain the ground portion 50 of the net structure 22 in contact with the ground, and helps to prevent any section of the net structure 22 from being pushed radially outward beyond the posts 24.

In those net structure 22 embodiments that include a mid-cord 40, the diameter/circumference of the net structure 22 at the mid-cord 40 may be less than the diameter/circumference of the net structure 22 at the upper cord 30. A smaller net structure 22 diameter/circumference at the mid-cord 40 may assist in creating an inward radial curvature of the net structure 22 (e.g., see FIGS. 5 and 6) that facilitates animal entry into the trap 20 as will be described below.

In some embodiments, the net structure 22 has independent lengthwise ends 32, 34 that can be brought together to close the circumference of the animal trap 20. In other embodiments, the net structure 22 may have a "closed" configuration, wherein the net structure 22 is formed with lengthwise ends 32, 34 that are attached to one another, not purposefully separable. An advantage of present disclosure animal traps 20 having a net structure 22 with independent lengthwise ends 32, 34 is that the net structure 22 can be disposed around natural features present where the trap 20 is being set up; e.g., a tree and/or brush can be disposed in the interior region 26 of the trap 20, and the trap 20 closed around them.

In those embodiments wherein the lengthwise ends 32, 34 of the net structure 22 are independent of one another, the lengthwise ends 32, 34 of the net structure 22 may be attached to one another in an abutting manner to close the net structure 22 (e.g., see FIG. 8). Alternatively, the net structure 22 may be set up with portions of the net structure 22 adjacent the lengthwise ends 32, 34 overlapping one another, with each lengthwise end attached to the net structure 22 (e.g., at a rib cord 44). The ability of the net structure 22 to be set up with portions of the net structure 22 overlapping one another, permits the user to alter the diameter/circumference of the animal trap 20.

Figure 11:
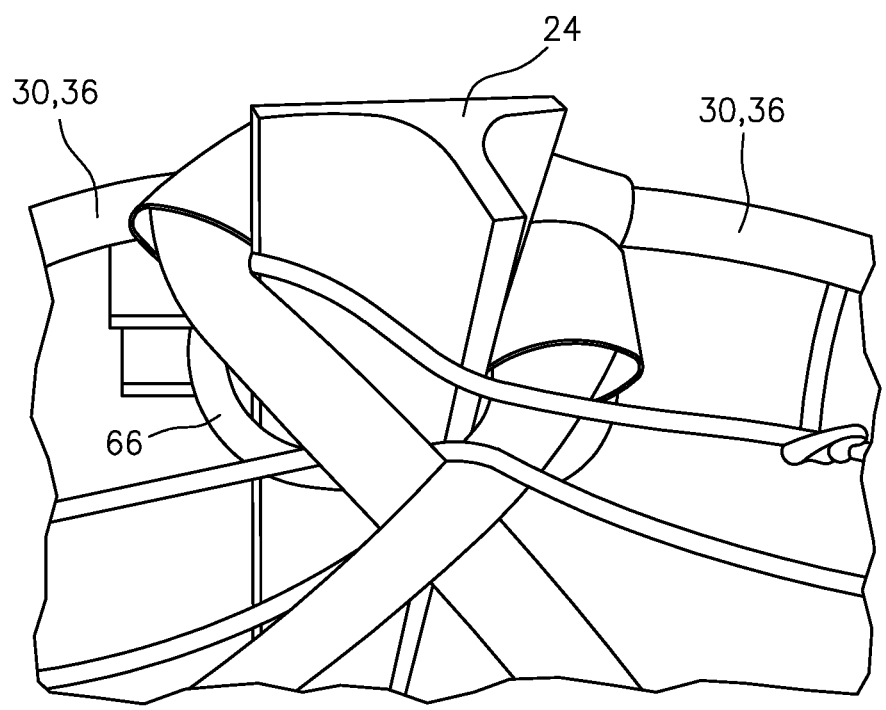
FIG. 11 diagrammatically illustrates both upper corners of the net structure looped around a post, engaged with tensioning structure hardware.

Regardless of whether the animal trap 20 is set up so that the lengthwise ends 32, 34 of the net structure 22 abut or overlap one another, the upper cord 30 is configured to create a fixed circumference. For example, as shown in FIGS. 10 and 11, the net structure 22 may be configured with a rib cord 44 disposed at each lengthwise end 32, 34 that is connected to the upper cord 30 (e.g., the rib cord 44 is integral with the upper cord 30), thereby forming an upper corner of the net structure 22. In these embodiments, the upper corner of the net structure 22 at each lengthwise end 32, 34 is looped around the exterior of a post 24. In those embodiments that use the J-hook 68 hardware, the upper corner of each lengthwise end 32, 34 may be captured within the open hook portion 70 of the J-hook 68 to inhibit the upper cord 30 from being dislodged from the post 24. Alternatively, mechanical fasteners (e.g., snap clips, carabiner clips, clamps, or the like) may be used to attach the upper cord 30 to itself to establish the fixed circumference.

When the upper cord 30 is configured with a fixed circumference and placed in tension, the upper cord 30 gives the animal trap 20 a structural integrity with a desirable hoop strength. As stated above, in some instances the posts 24 may be installed in such a fashion that no tensioning structures 58 are required, and the upper cord 30 may be placed in tension around the posts 24. In other instances, tensioning structures 58 may be used to draw the posts 24 radially outward and thereby place the upper cord 30 in tension. Regardless of how the upper cord 30 is tensioned, the tension produces circumferential stress (sometimes referred to as "hoop stress") within the upper cord 30. The circumferential stress gives the upper cord 30, and therefore the net structure 22, a hoop structural integrity that resists forces acting on the net structure 22; e.g., radially outward forces produced by animals trapped within the interior region 26 of the trap 20 impacting a segment of the net structure 22. Although a portion of the net structure 22 impacted by an animal may deflect radially outward to a limited degree, the hoop configuration of the net structure 22 distributes some amount of the impact energy to the circumferential remainder of the net structure 22.

Additional mechanical fasteners may be used to hold the remainder of the lengthwise ends 32, 34 of the trap 20 between the upper lateral edge 36 and the lower lateral edge 38 together; e.g., see FIG. 8. There are a variety of different ways in which the lengthwise ends 32, 34 may be held together, and the present disclosure is not, therefore, limited to any particular configuration for holding the lengthwise ends 32, 34 together.

Figure 12:
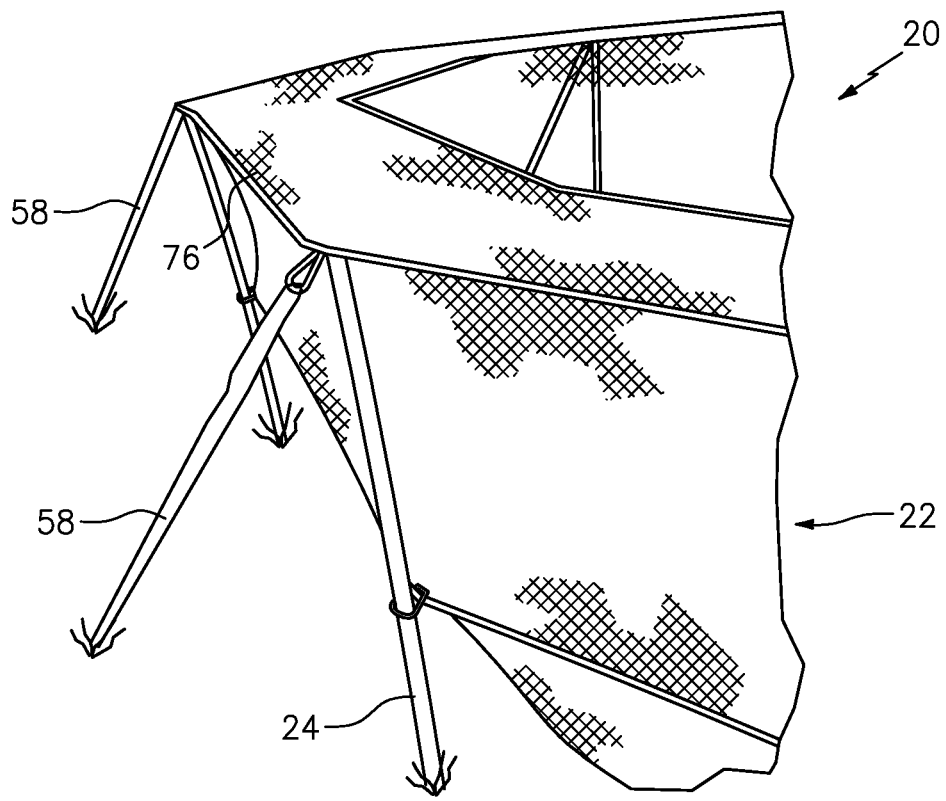
FIG. 12 diagrammatically illustrates an upper edge panel embodiment.
Figure 13:
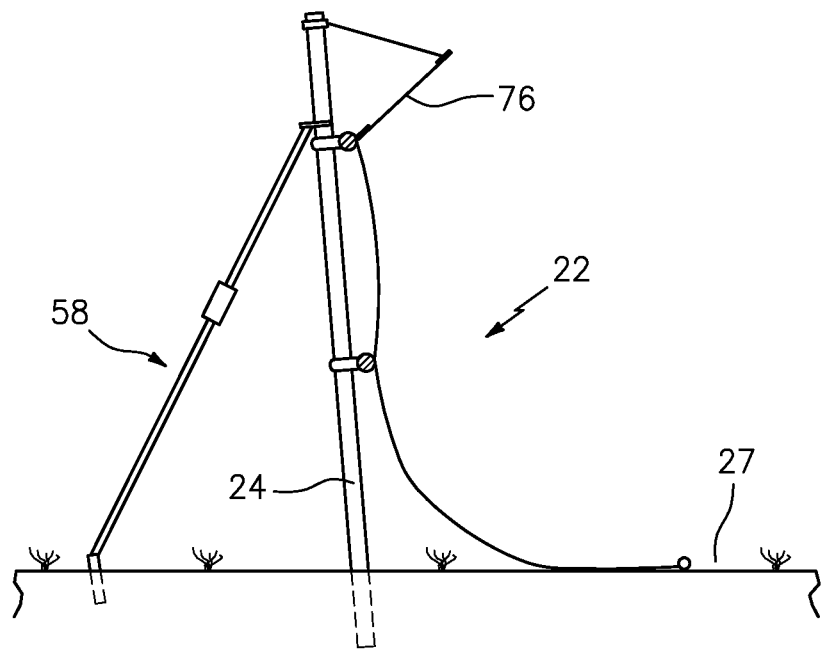
FIG. 13 diagrammatically illustrates an upper edge panel embodiment.

Referring to FIGS. 12 and 13, in some embodiments the animal trap 20 may include an upper edge panel 76 that extends around the circumference of the trap 20, and extends a distance radially inward from the upper cord 30 to inhibit any attempt by a trapped animal to exit the trap 20 over the net structure 22. In the embodiment shown in FIG. 12, the upper edge panel 76 is attached around the circumference of the animal trap 20 and placed in tension. As a result, the upper edge panel 76 resides substantially horizontal. In the embodiment shown in FIG. 13, the upper edge panel 76 is attached around the circumference of the animal trap 20 adjacent the upper cord 30, and is also attached to each post 24 at a position above the upper cord 30. As a result, the upper edge panel 76 extends both radially inwardly and upwardly. The embodiments shown in FIGS. 12 and 13 are provided to show non-limiting examples of how an upper edge panel 76 may be configured, and the present disclosure is not limited thereto.

FIG. 14 illustrates an embodiment of the present disclosure that includes a structural ring 78 disposed at the upper lateral edge 36 of the trap. The structural ring 78 (e.g., made of tubing, or a solid rod) may be used as an alternative to the upper cord 30, with the upper lateral edge 36 of the net structure 22 attached to the structural ring 78. The structural ring 78 may be produced in circumferential subsections for ease of transport/storage, and those circumferential subsections attached to one another on-site to form the structural ring 78.

Figure 15:
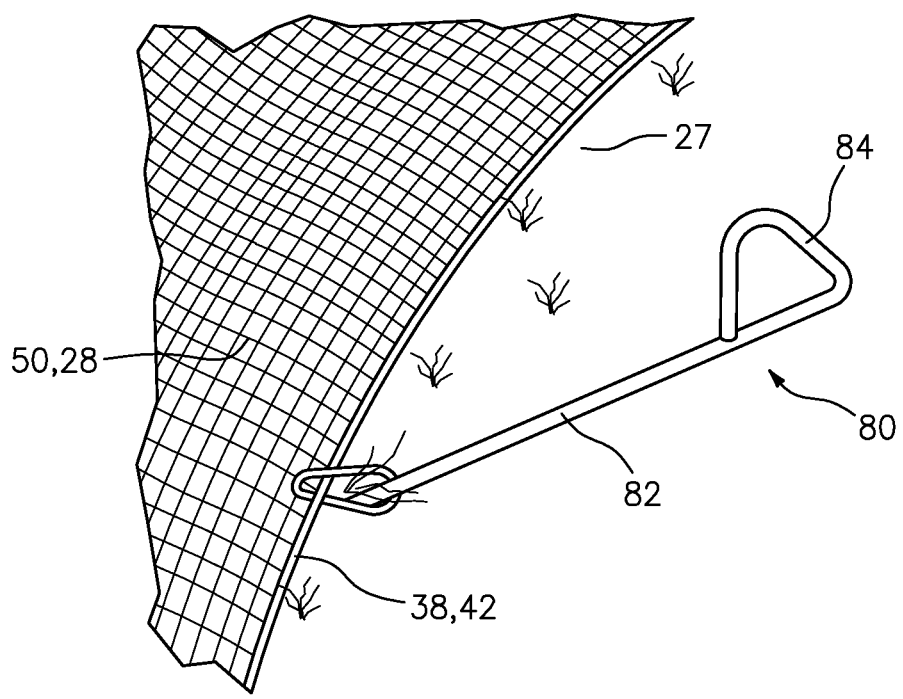
FIG. 15 illustrates an anchor stake embodiment securing a lower lateral edge of the net structure.
Figure 16:
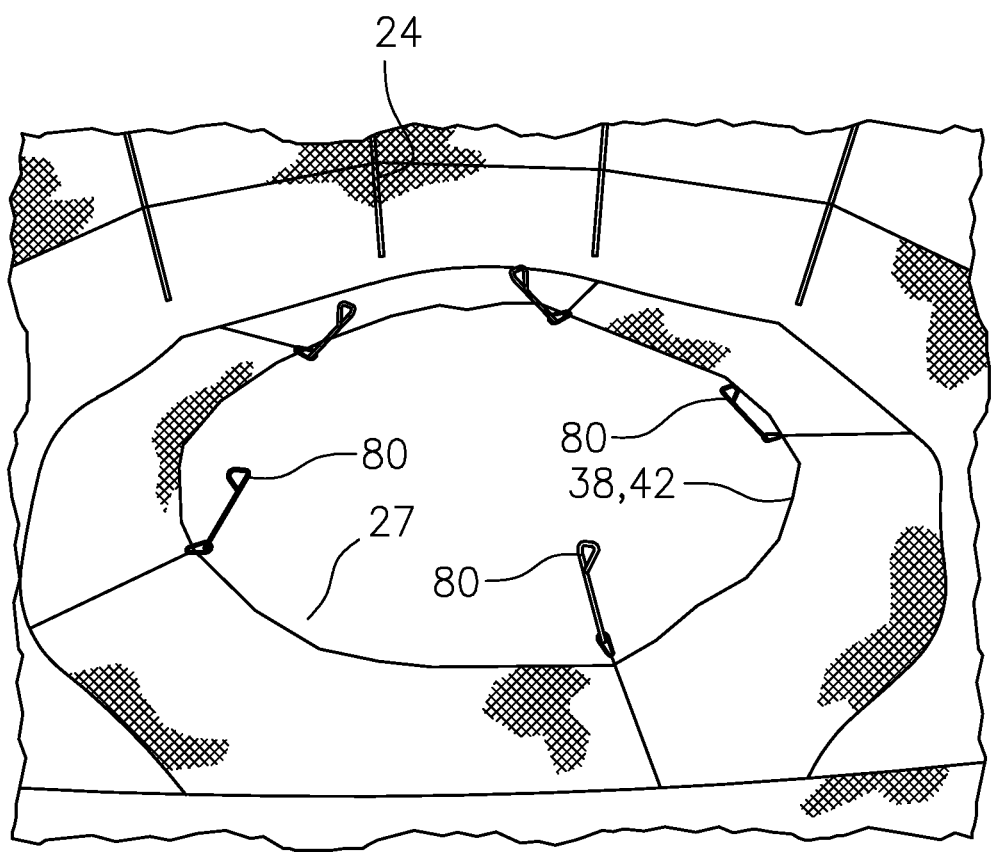
FIG. 16 illustrates a plurality of anchor stakes securing the lower lateral edge of a net structure in a central location of the trap.

In some embodiments, the animal trap 20 may include one or more anchoring devices configured for engagement with the lower lateral edge 38 and operable to assist in maintaining the position of the ground portion 50 of the net structure 22. A non-limiting example of an anchoring device is an anchor stake 80 that can be deployed at the lower lateral edge 38 to assist in maintaining the position of the ground portion 50 of the net structure 22. FIGS. 15 and 16 illustrate an example of an acceptable anchor stake 80, having a body 82 and a head 84 disposed at one end of the body 82. Mechanical fasteners (e.g., snap clips, carabiner clips, or the like) may be used to connect the lower lateral edge 38 to the respective anchor stake 80. The body 82 is configured to be received within the mechanical fastener and can be driven into the ground. The head 84 of each anchor stake 80 is preferably configured so that the mechanical fastener cannot pass over the head 84. Alternatively, the body 82 of each anchor stake 80 can be configured to pass through an opening 46 in the net 28, and the head 84 configured so it cannot pass through an opening 46 in the net 28 (thereby obviating the need for fasteners). In the installed position, the net 28 is allowed to slide up and down the anchor stakes 80. The anchor stakes 80 ensure that the ground portion 50 remains positioned towards the center of the trap interior region 26. The present disclosure is not limited to anchor stakes 80, and other anchoring devices may be used alternatively. For example, the lower lateral edge 38 may be attached to cleat driven into the ground. A rope (or cord, cable, etc.) loosely connected to the lower lateral edge 38 will allow the net 28 is be pushed upwardly when the animal enters the trap, but will limit the travel of the lower lateral edge away from the center of the trap 20.

As is clear from above, the present disclosure animal trap 20 embodiments are readily portable and can be transported to regions both accessible and inaccessible by conventional vehicles (e.g., cars, SUVs, trucks, etc.). Once a trap site is selected, the perimeter of the animal trap 20 may be established and the posts 24 installed in the ground. As stated above, in some instances a "natural" post (e.g., an existing tree or the like) may be used as one or more of the posts 24.

Figure 17:
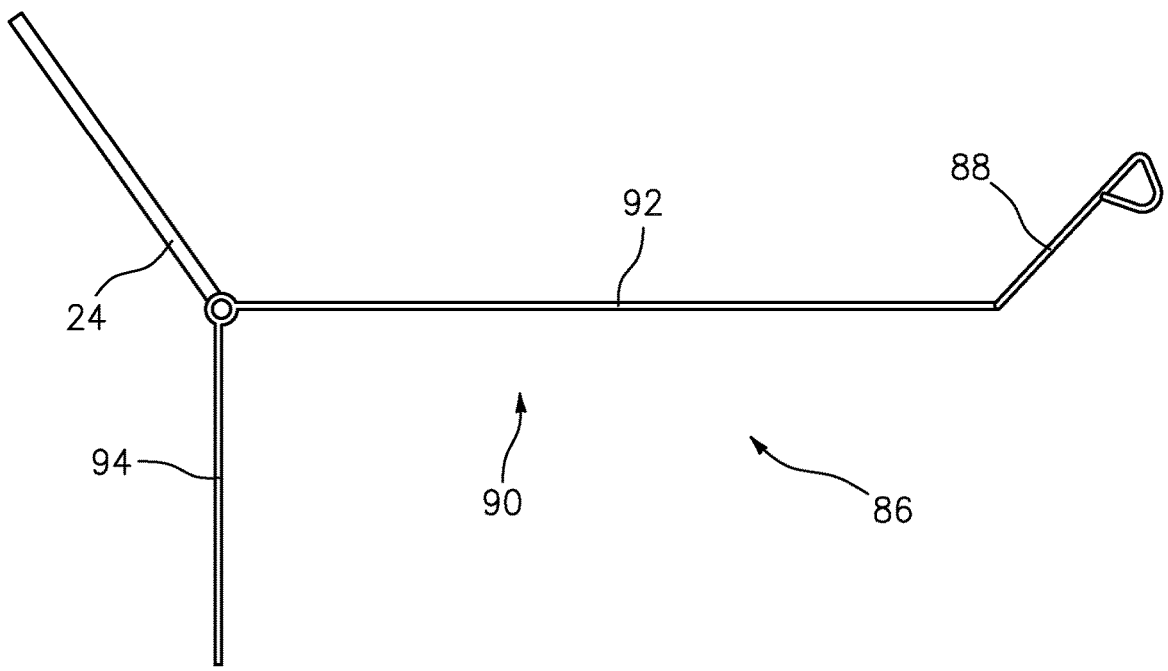
FIGS. 17 and 18 illustrate a tool for location posts.
Figure 18:
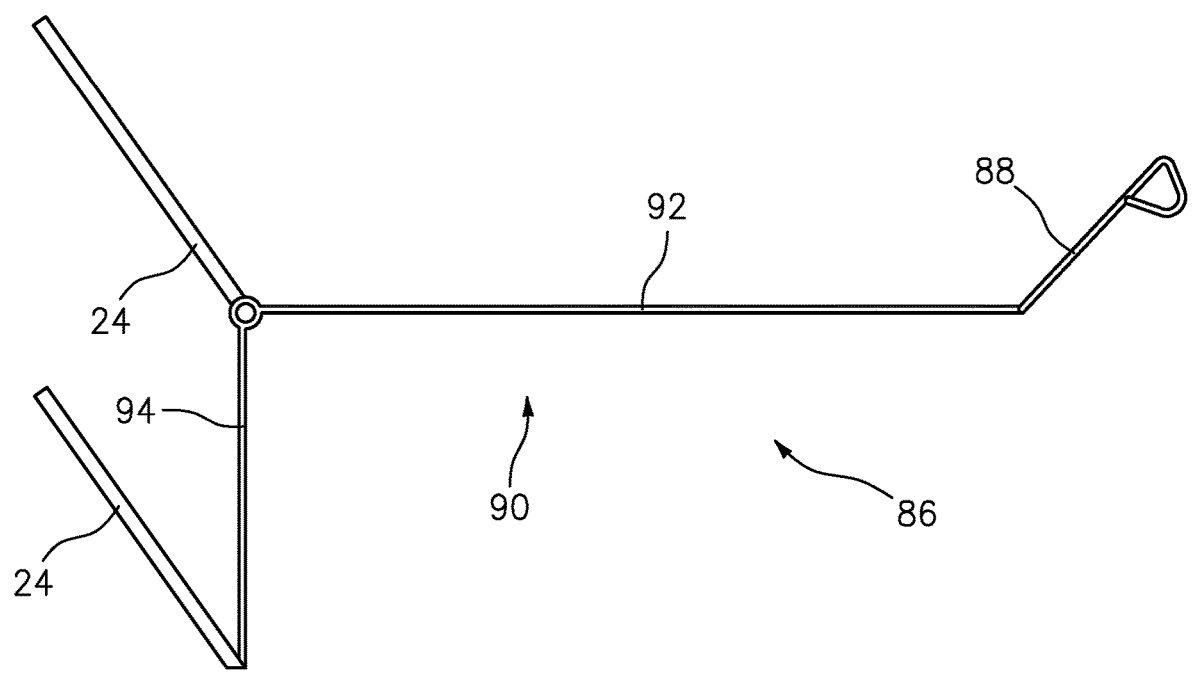

Referring to FIGS. 17 and 18, some embodiments of the present disclosure trap are provided with a tool 86 for spacing the posts 24 apart from one another and facilitating the installation of the trap 20. The tool 86 utilizes a center stake 88 driven into the ground at the geometric center of the trap 20, and a measuring strap 90. The measuring strap 90 includes a radial member 92 and a circumferential member 94. A pivot ring is disposed at one end of the radial member 92, and one end of the circumferential member 94 is attached to the opposite end of the radial member 92. To install the first post 24, the pivot ring is disposed around the center stake 88 for pivotal movement. The radial member 92 is pulled taut radially outward. The outer end of the radial member 92 defines a first post 24 position. To establish a second, adjacent post 24 position, an end of the circumferential member 94 (opposite the end attached to the radial member 92 is connected to the first post 24. The radial member 92 and the circumferential member 94 are drawn taut (now substantially "L" shaped), and the point of attachment between the radial member 92 and the circumferential member 94 defines the next post 24 position. This process is repeated until all of the posts 24 are located and installed into the ground. The post to post spacing is typically chosen based on the application (i.e., what animal is to be trapped), and more specifically the post to post spacing is chosen to facilitate animal entry, but close enough to prevent escape.

Once the posts 24 are installed, the net structure 22 may be drawn around the trap circumference established by the installed posts 24, the lengthwise ends 32, 34 of the net structure 22 attached to one another (e.g., by mechanical fasteners), and the upper cord 30 may be attached to the posts 24 as described above; e.g., looped around the exterior of the respective post 24. In those embodiments that include J-hooks 68, the upper cord 30 may be disposed in the open hook portion 70 of the J-hook 68 to inhibit the upper cord 30 from being dislodged from the post 24. If J-hooks 68 are not utilized, an alternative mechanism may be used to maintain the upper cord 30 at the desired position on the post 24. Once the upper cord 30 is attached to all of the posts 24, the upper cord 30 may be drawn into tension; e.g., by using the tensioning structures 58 in a coordinated manner to draw the upper cord 30 of the net structure 22 into tension and provide the desirable hoop strength.

The lower lateral edge 38 of the net structure 22 may be positioned centrally in the interior of the trap 20 before or after the upper cord 30 is brought into tension. In those embodiments that utilize anchor stakes 80 (or other anchoring device), a number of anchor stakes 80 adequate to centrally maintain the lower lateral edge 38 are installed, but not so many so as to inhibit animal ingress into the trap 20. Typically, an anchor stake 80 disposed every other post 24 works well. As stated above, mechanical fasteners (e.g., snap clips, carabiner clips, or the like) may be used to connect the lower lateral edge 38 to the respective anchor stake 80. Once the anchor stakes 80 are installed, the net 28 is allowed to slide up and down the anchor stakes 80, and the heads 84 of the stakes 80 prevent the net 28 from dislodging.

In those embodiments that include a mid-cord 40, the mid-cord 40 may be connected to each post 24 by a mechanical fastener (e.g., a ratchet strap; see FIG. 8). Preferably, the fastener is configured so that the mid-cord 40 can move lengthwise some amount during use of the animal trap 20 and the net structure 22 at the mid-cord 40 is therefore not fixed to the post 24; i.e., the mid-cord 40 is able to slide some amount. Advantages of this type of connection are described below.

Figure 19:
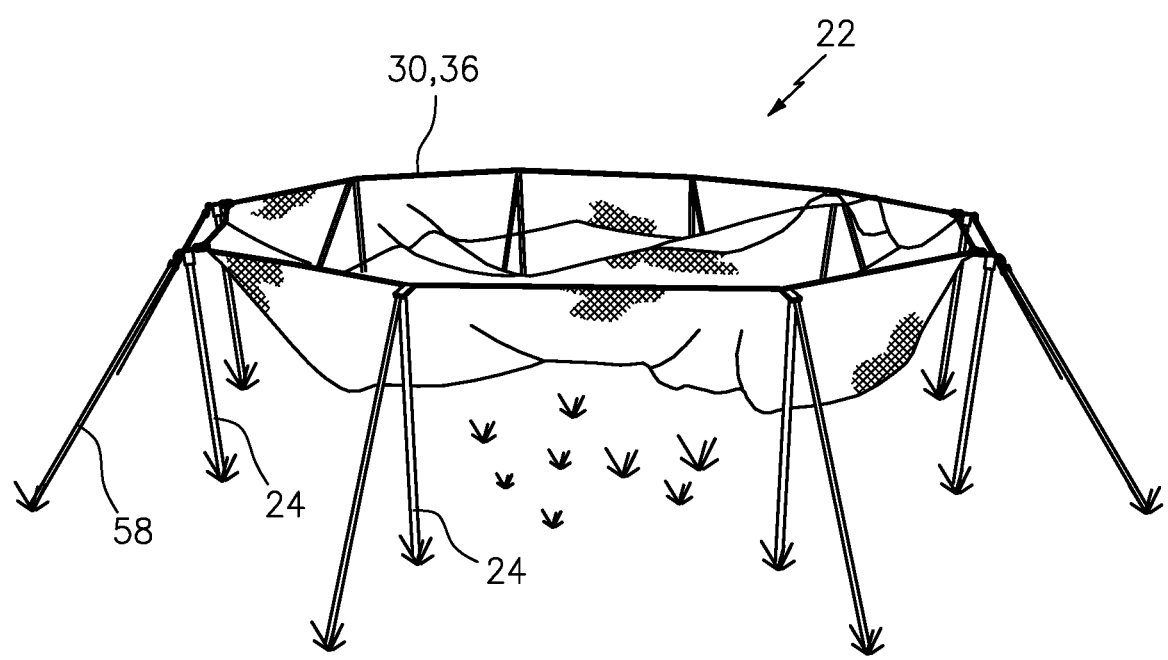
FIG. 19 diagrammatically illustrates a present disclosure animal trap in a pre-set configuration.

After the animal trap 20 is initially set up, the net structure 22 may be configured in a "pre-set" configuration that allows the animals to travel under the net structure 22 (i.e., all or only portions of the net 28 may be held up off the ground) and therefore into and out of the trap 20 interior region 26 without obstruction. e.g., see FIG. 19. Bait placed on the ground in the interior region 26 of the trap 20 will draw the animals into the trap 20. The process of maintaining the trap 20 in a pre-set configuration with bait disposed in the trap 20 interior region 26 will allow the animals to become accustomed to the trap 20. In the case of feral swine, it is known that feral swine are intelligent animals that are very cautious around unknown structures. Pre-setting the trap 20 often greatly improves the number of animals that can be caught in a single setting simply by improving the confidence of the animals relative to the trap 20. Pre-setting is not required, however, for the present disclosure animal trap 20 to work effectively.

Once the operator is ready to capture animals, some amount of bait is disposed in the interior region 26 of the trap 20 and the net structure 22 is closed (e.g., the lengthwise ends 32, 34 of the net structure 22 attached to one another, and the ground portion 50 secured to the ground; i.e., the set configuration). As can be seen in FIGS. 1, 5, and 6, in this set configuration, at least a portion of the wall portion 48 curves radially inwardly and eventually contacts the ground. The lower lateral edge 38 in contact with the ground defines the trap opening 27. The inward radial curvature of the wall portion 48 is understood to facilitate animal entry into the trap 20. The collapsible, flexible, and lightweight nature of the net structure 22 allows animals to work their way under the net structure 22 with minimal resistance, past the lower lateral edge 38 of the net structure 22 and through the trap opening 27 to access the bait. Feral swine, in particular, naturally root with their snouts, and this rooting behavior will naturally raise some of the wall portion 48 and the ground portion 50, thereby providing access to the interior region 26 of the animal trap 20 via the trap opening 27. Once the animal has traveled completely under the net structure 22, gravity causes the net structure 22 to fall back to the ground and the animal is trapped. In contrast to solid cage traps or corral traps formed from stiff wire fencing that only permit ingress through a particular door structure, the present disclosure trap 20 allows an animal to enter the trap 20 at any circumferential position of the trap 20. This aspect is believed to increase the confidence of the animals being trapped and consequently the yield of the trap 20.

As can be seen from the description above, some present disclosure animal trap 20 embodiments—once set up—do not require any human intervention. This is in direct contrast to corral or box trap systems that require an operator to actuate the trap door to trap the animals.

Once the animals are trapped, it is not uncommon for the animals to attempt to escape the trap 20. As indicated above, these attempts often take the form of charging the net structure 22 or attempting to chew through the net structure 22. The hoop strength of the animal trap 20 created by tensioning the upper cord 30 (or using a structural ring 78) inhibits the trapped animals from knocking down any portion of the trap 20. In the case of feral swine, the impacts are typically in the wall portion 48 of the net structure 22. In those embodiments that include a mid-cord 40, the tensioning of the mid-cord 40 may be less than that of the upper cord 30, and the fasteners connecting the mid-cord 40 to the posts 24 allow the mid-cord 40 to slide/travel circumferentially to some degree. As a result, the portion of the net structure 22 impacted by the animal deflects radially outwardly and dissipates at least a part of the impact energy. In addition, however, the mid-cord 40 which extends the entire circumference of the trap 20 also distributes some amount of the impact energy to posts 24 beyond the impact area. Hence, the posts 24 collectively operate to maintain the structural integrity of the trap 20; not just the posts 24 adjacent the impact region. In addition, as the animal approaches the net structure 22, the animal will likely step on the ground portion 50 and their weight will help to anchor the net structure 22 to the ground.

The height of the net structure 22 above the ground is typically great enough so that the animal has no chance of jumping over the wall of the trap 20. In the case of a trap 20 configured to catch feral swine, a wall height of four to eight feet (i.e., 4-8 ft.; 122-244 cm) is typically sufficient. However, as stated above, some embodiments of the present disclosure may include an upper edge panel 76 that extends radially inwardly to increase the difficulty of escape over the wall of the animal trap 20.

Alternative embodiments of the present disclosure animal trap 20 can be configured to be selectively actuable by an operator. For example, some trap 20 embodiments may include one or more actuating devices that hold at least a portion of the net structure 22 off the ground and thereby allow unimpeded access into the interior of the trap. Once a sufficient number of animals are located in the interior region 26 of the trap 20, the actuating devices may be actuated by the operator and the net structure 22 released, allowing it to fall to the ground. The present disclosure is not limited to any particular type of actuating device.

The present disclosure animal trap 20 is substantially lighter than known animal traps configured to trap similar animals. Known feral swine traps are typically made of wood and/or metal and often weigh hundreds of pounds, and are difficult to transport. The present disclosure animal trap 20 is a small fraction of the weight and can be compactly packaged for easy storage or transport. The present disclosure animal trap 20 is substantially less expensive than known animal traps configured to trap similar animals. The net structure 22 of the present disclosure animal trap 20 can enclose a substantial trap area at a much lower cost than solid member cage traps or hardwire corral traps, and does not require an intricate actuable door assembly. The present disclosure animal trap 20 is substantially more versatile than known animal traps configured to trap similar animals. The present disclosure animal trap 20 does not require the trap area to be cleared, and can be used on sloped ground. In fact, the ability of the present animal trap 20 to be used in a vegetated area likely will improve the effectiveness of the trap 20 since the setting is more "natural" and the trap 20 less apparent to the animals being trapped.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Moreover, while various aspects, features and concepts may be expressly identified herein as being inventive or forming part of a disclosure, such identification is not intended to be exclusive, but rather there may be inventive aspects, concepts, and features that are fully described herein without being expressly identified as such or as part of a specific disclosure, the disclosures instead being set forth in the appended claims. Descriptions of exemplary methods or processes are not limited to inclusion of all steps as being required in all cases, nor is the order that the steps are presented to be construed as required or necessary unless expressly so stated. The words used in the claims have their full ordinary meanings and are not limited in any way by the description of the embodiments in the specification unless specifically indicated otherwise.

What is claimed is:

1. A flexible animal trap net structure, comprising:
a collapsible net formed from a plurality of spaced apart flexible lines that define a plurality of openings within the net, the net having a width that extends between an upper lateral edge and a lower lateral edge, a first length that extends between a first lengthwise end and a second lengthwise end at the upper lateral edge, and a second length that extends between the first lengthwise end and the second lengthwise end at the lower lateral edge, wherein the second length is less than the first length;
wherein the collapsible net includes a first net region contiguous with the upper lateral edge and extending from the first lengthwise end to the second lengthwise end, and all of the plurality of spaced apart flexible lines disposed in the first net region having a first uniform configuration, and a second net region contiguous with the lower lateral edge and extending from the first lengthwise end to the second lengthwise end, and all of the plurality of spaced apart flexible lines disposed in the second net region having a second uniform configuration, the first net region extending toward and adjoining the second net region;
wherein the plurality of openings within the collapsible net includes a plurality of first openings in the first net region and a plurality of second openings in the second net region;
wherein the plurality of first openings each define a first area and the plurality of second openings each define a second area, and the first area is larger than the second area;
a flexible upper cord attached to the collapsible net at the upper lateral edge extending the first length of the net; and
a flexible bottom cord attached to the collapsible net at the lower lateral edge extending the second length of the net, wherein the flexible bottom cord is a weighted cord having a lead core; and
wherein the collapsible net is configurable in a closed configuration where the first lengthwise end and the second lengthwise end are disposed proximate each other, and the flexible bottom cord attached to the collapsible net at the lower lateral edge defines a trap opening.

2. A flexible animal trap net structure, comprising:
a collapsible net formed from a plurality of spaced apart flexible lines that define a plurality of openings within the net, the net having a width that extends between an upper lateral edge and a lower lateral edge, a first length that extends between a first lengthwise end and a second lengthwise end at the upper lateral edge, and a second length that extends between the first lengthwise end and the second lengthwise end at the lower lateral edge, wherein the second length is less than the first length;
wherein the collapsible net includes a first net region contiguous with the upper lateral edge and extending from the first lengthwise end to the second lengthwise end, and all of the plurality of spaced apart flexible lines disposed in the first net region having a first uniform configuration, and a second net region contiguous with the lower lateral edge and extending from the first lengthwise end to the second lengthwise end, and all of the plurality of spaced apart flexible lines disposed in the second net region having a second uniform configuration, the first net region extending toward and adjoining the second net region;
wherein the plurality of openings within the collapsible net includes a plurality of first openings in the first net region and a plurality of second openings in the second net region;
wherein the plurality of first openings each define a first area and the plurality of second openings each define a second area, and the first area is larger than the second area;
wherein the first uniform configuration comprises each said flexible line within the plurality of spaced apart flexible lines disposed in the first net region having a first diameter, and the second uniform configuration comprises each said flexible line within the plurality of spaced apart flexible lines disposed in the second net region having a second diameter, and the second diameter is smaller than the first diameter;
a flexible upper cord attached to the collapsible net at the upper lateral edge extending the first length of the net; and
a flexible bottom cord attached to the collapsible net at the lower lateral edge extending the second length of the net;
wherein the flexible upper cord has a third diameter, and the flexible bottom cord has a fourth diameter, and both the third diameter and the fourth diameter are greater than the first diameter; and
wherein the collapsible net is configurable in a closed configuration where the first lengthwise end and the second lengthwise end are disposed proximate each other, and the flexible bottom cord attached to the collapsible net at the lower lateral edge defines a trap opening.

3. The net structure of claim 2, wherein the first uniform configuration comprises each said flexible line within the plurality of spaced apart flexible lines disposed in the first net region consisting of a first material, and the second uniform configuration comprises each said flexible line within the plurality of spaced apart flexible lines disposed in the second net region consisting of a second material.

4. The net structure of claim 2, wherein the second length is in a range of 35-90% of the first length.

5. The net structure of claim 2, wherein in the first net region, the plurality of spaced apart flexible lines are disposed in an orthogonal arrangement with a first subset of said flexible lines extending in a first direction, and a second subset of said flexible lines extending in a second direction, the second direction being perpendicular to the first direction.

6. The net structure of claim 2, wherein in the second net region, the plurality of spaced apart flexible lines are disposed in an orthogonal arrangement with a first subset of said flexible lines extending in a first direction, and a second subset of said flexible lines extending in a second direction, the second direction being perpendicular to the first direction.

7. The net structure of claim 2, further comprising a mid-cord attached to the collapsible net, extending lengthwise between the first lengthwise end and the second lengthwise end, and disposed widthwise between the flexible upper cord and the flexible bottom cord.

8. The net structure of claim 2, further comprising a first rib cord disposed at the first lengthwise end, and a second rib cord disposed at the second lengthwise end, wherein the first rib cord and the second rib cord are attached to the flexible upper cord and to the flexible bottom cord, and extend widthwise there between.

9. A trap for trapping animals, comprising:
a flexible net structure including:
a collapsible net formed from a plurality of spaced apart flexible lines that define a plurality of openings within the net, the net having a width that extends between an upper lateral edge and a lower lateral edge, a first length that extends between a first lengthwise end and a second lengthwise end at the upper lateral edge, and a second length that extends between the first lengthwise end and the second lengthwise end at the lower lateral edge, wherein the second length is less than the first length;
wherein the collapsible net includes a first net region contiguous with the upper lateral edge and extending from the first lengthwise end to the second lengthwise end, and all of the plurality of spaced apart flexible lines disposed in the first net region having a first uniform configuration, and a second net region contiguous with the lower lateral edge and extending from the first lengthwise end to the second lengthwise end, and all of the plurality of spaced apart flexible lines disposed in the second net region having a second uniform configuration, the first net region extending toward and adjoining the second net region;
wherein the plurality of openings within the collapsible net includes a plurality of first openings in the first net region and a plurality of second openings in the second net region;
wherein the plurality of first openings each define a first area and the plurality of second openings each define a second area, and the first area is larger than the second area;
wherein the first uniform configuration comprises each said flexible line within the plurality of spaced apart flexible lines disposed in the first net region having a first diameter, and the second uniform configuration comprising each said flexible line within the plurality of spaced apart flexible lines disposed in the second net region having a second diameter, and the second diameter is smaller than the first diameter; and
a flexible upper cord attached to the collapsible net at the upper lateral edge extending the first length of the net;
a flexible bottom cord attached to the collapsible net at the lower lateral edge extending the second length of the net;
wherein the flexible upper cord has a third diameter, and the flexible bottom cord has a fourth diameter, and both the third diameter and the fourth diameter are greater than the first diameter;
wherein the collapsible net is configurable in a closed configuration where the first lengthwise end and the second lengthwise end are disposed proximate each other, and the flexible bottom cord attached to the collapsible net at the lower lateral edge defines a trap opening; and
a plurality of posts configured for securement to a ground surface and for connection with the collapsible net.

10. The trap of claim 9, wherein in the closed configuration the plurality of posts is configured to position the flexible net structure to have a wall portion and a ground portion, the ground portion contiguous with the lower lateral edge and surrounding the trap opening, and the ground portion is configured to reside on the ground surface, and the ground portion has a width that is about 25%-40% of the width of the net.

11. The trap of claim 9, further comprising at least one anchoring device configured for coupling at least a portion of the lower lateral edge of the net with the ground surface, the coupling limiting movement of the at least a portion of the lower lateral edge relative to the ground surface.

12. The trap of claim 11, wherein the at least one anchoring device includes a plurality of said anchoring devices in communication with the lower lateral edge of the net, each said anchoring device of the plurality of anchoring devices configured to be driven into the ground surface and configured to allow the portion of the lower lateral edge residing on the ground surface by gravitational force to be lifted off of the ground surface a limited distance and to return to the ground surface by said gravitational force.

13. The trap of claim 9, wherein the flexible net structure further comprises a flexible mid-cord attached to the collapsible net, extending lengthwise between the first lengthwise end and the second lengthwise end, and disposed widthwise between the upper cord and the bottom cord.

14. The trap of claim 9, wherein the flexible net structure further comprises a plurality of rib cords, each said rib cord of the plurality of rib cords extending between the upper lateral edge and the lower lateral edge, each said rib cord of the plurality of rib cords spaced apart from one another.

15. The trap of claim 9, further comprising a plurality of tensioning structures, each said tensioning structure of the plurality of tensioning structures configured to cause the upper cord to be pulled in a direction having an outwardly radial component, the plurality of tensioning structures collectively placing the upper cord in circumferential tension.

16. The trap of claim 9, wherein the second length is in a range of 35-90% of the first length.

17. The trap of claim 9, wherein the flexible net structure further comprises a flexible mid-cord attached to the collapsible net, extending lengthwise between the first lengthwise end and the second lengthwise end, and disposed widthwise between the flexible upper cord and the flexible bottom cord, and wherein the flexible mid-cord has a fifth diameter, and the fifth diameter is greater than the first diameter.

18. The trap of claim 9, wherein the flexible net structure further comprises a plurality of rib cords, each said rib cord of the plurality of rib cords extending between the upper lateral edge and the lower lateral edge, each said rib cord of the plurality of rib cords spaced apart from one another, and each said rib cord of the plurality of rib cords has a fifth diameter and the fifth diameter is greater than the first diameter.

* * * * *